US006125879A

United States Patent [19]

Prosper et al.

[11] Patent Number: 6,125,879

[45] Date of Patent: *Oct. 3, 2000

[54] RELEASE MECHANISM FOR A BATTERY POWERED WHEELED GARDEN SPRAYER

[75] Inventors: Jacob R. Prosper, Brockville; Tri Nguyen, Toronto; Colin Dyke, North Augusta; Jerry N. Moscovitch, Toronto; Rene Allen, Oakville, all of Canada; Gabriel E. Concari, Eldersburg, Md.

[73] Assignee: Black & Decker Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/066,203

[22] Filed: Apr. 24, 1998

Related U.S. Application Data

[63] Continuation-in-part of application No. 08/957,877, Aug. 20, 1997.

[51] Int. Cl.[7] .......... F02K 24/04

[52] U.S. Cl. .......... 137/316; 137/587

[58] Field of Search .......... 137/315, 316, 137/899.4, 565.18, 587; 251/149.9, 148; 222/3, 401; 239/124, 146, 660

[56] References Cited

U.S. PATENT DOCUMENTS

| | | | |
|---|---|---|---|
| 929,597 | 7/1909 | Johnson . | |
| 982,140 | 1/1911 | Keighley . | |
| 1,277,269 | 8/1918 | Sturcke . | |
| 1,714,296 | 5/1929 | Carlson | 137/587 X |
| 2,086,969 | 7/1937 | Strelow | 137/587 X |
| 2,227,222 | 12/1940 | Henderson | 299/40 |
| 2,385,514 | 9/1945 | Hawkins | 214/65.4 |
| 2,465,554 | 3/1949 | Roy | 230/217 |
| 2,493,599 | 1/1950 | Schroeder | 222/176 |
| 2,529,645 | 11/1950 | Winks et al. | 222/401 X |
| 2,544,651 | 3/1951 | Boardman | 137/587 X |
| 2,629,539 | 2/1953 | Drewes, Jr. | 230/58 |
| 2,853,212 | 9/1958 | Anderson | 222/402 |
| 2,953,387 | 9/1960 | Portner | 280/47.13 |
| 3,050,260 | 8/1962 | McCrae | 239/150 |
| 3,173,584 | 3/1965 | Giavasis | 222/263 |
| 3,608,832 | 9/1971 | Hughes et al. | 239/419 |
| 3,797,743 | 3/1974 | Kommers et al. | 239/148 |
| 3,856,211 | 12/1974 | Williams | 239/685 |
| 3,894,816 | 7/1975 | Davis et al. | 417/413 |
| 3,901,449 | 8/1975 | Bochmann | 239/332 |
| 3,915,351 | 10/1975 | Kiralfy | 222/385 |
| 3,940,843 | 3/1976 | Yeager | 29/437 |
| 3,963,178 | 6/1976 | Collins | 239/8 |
| 3,977,602 | 8/1976 | Kirch | 239/74 |
| 4,030,665 | 6/1977 | Koyama | 239/373 |
| 4,034,916 | 7/1977 | Forsberg | 239/373 |

(List continued on next page.)

FOREIGN PATENT DOCUMENTS

| | | |
|---|---|---|
| 656686 | 1/1963 | Canada . |
| 297 938 | 1/1989 | European Pat. Off. . |
| 2055868 | 5/1972 | Germany . |
| 54-166038 | 11/1979 | Japan . |
| 61-165826 | 10/1986 | Japan . |
| 62-42608 | 3/1987 | Japan . |
| 2164533 | 5/1986 | United Kingdom . |
| 2102662 | 2/1993 | United Kingdom . |
| WO 95/01225 | 12/1995 | WIPO . |

*Primary Examiner*—Kevin Weldon
*Attorney, Agent, or Firm*—Foley & Lardner

[57] ABSTRACT

A release mechanism is provided for a portable sprayer having a pump unit removably connected to a fluid tank. The release mechanism provides locking for the connection between the tank and the pump unit. Moreover, the release mechanism unlocks the connection between the pump unit and the tank, and operates in conjunction with a pressure relief mechanism to concurrently de-pressurize the tank to ease disconnection from the pump unit. Further, the compass of the pressure relief mechanism also serve to automatically relieve pressure when the pressure in the tank exceeds a predetermined threshold level.

28 Claims, 30 Drawing Sheets

U.S. PATENT DOCUMENTS

| | | | |
|---|---|---|---|
| 4,080,105 | 3/1978 | Connell | 417/26 |
| 4,104,744 | 8/1978 | Odencrantz | 4/159 |
| 4,135,669 | 1/1979 | Bridges et al. | 239/373 |
| 4,166,579 | 9/1979 | Beise | 239/526 |
| 4,269,356 | 5/1981 | Rose | 239/167 |
| 4,301,971 | 11/1981 | Cornelius, deceased et al. | 239/351 |
| 4,618,099 | 10/1986 | Nagao et al. | 239/332 |
| 4,621,984 | 11/1986 | Fussell | 417/234 |
| 4,638,949 | 1/1987 | Mancel | 239/307 |
| 4,651,903 | 3/1987 | Pagliai | 222/175 |
| 4,702,419 | 10/1987 | Luchsinger | 239/333 |
| 4,712,983 | 12/1987 | Moynihan | 417/234 |
| 4,717,074 | 1/1988 | Karliner et al. | 239/288 |
| 4,725,004 | 2/1988 | Baran, Jr. | 239/164 |
| 4,776,766 | 10/1988 | Brent | 417/44 |
| 4,782,982 | 11/1988 | Ellison | 222/1 |
| 4,787,560 | 11/1988 | DeYoreo | 239/373 |
| 4,865,255 | 9/1989 | Luvisotto | 239/149 |
| 4,881,687 | 11/1989 | Ballu | 239/332 |
| 4,890,752 | 1/1990 | Ota et al. | 215/1 |
| 4,913,345 | 4/1990 | Setter | 239/127 |
| 4,925,105 | 5/1990 | Lin | 239/154 |
| 4,930,664 | 6/1990 | Ellison | 222/1 |
| 4,930,686 | 6/1990 | Ellison | 222/394 |
| 4,971,498 | 11/1990 | Goforthe | 411/134 |
| 4,972,975 | 11/1990 | Fuhrig | 222/182 |
| 4,984,742 | 1/1991 | Ellison | 239/373 |
| 5,014,884 | 5/1991 | Wunsch | 222/333 |
| 5,029,758 | 7/1991 | Chayer | 239/172 |
| 5,033,520 | 7/1991 | Kuehmichel | 141/231 |
| 5,064,170 | 11/1991 | Feyen | 251/344 |
| 5,072,884 | 12/1991 | Ellison et al. | 239/373 |
| 5,119,993 | 6/1992 | Gunzel | 239/654 |
| 5,127,808 | 7/1992 | Nichols et al. | 417/411 |
| 5,150,837 | 9/1992 | Ferrari | 239/153 |
| 5,154,317 | 10/1992 | Roppolo, III | 222/66 |
| 5,248,089 | 9/1993 | Bekius | 239/154 |
| 5,301,877 | 4/1994 | Madison | 239/154 |
| 5,307,995 | 5/1994 | Jackson et al. | 239/373 |
| 5,320,859 | 3/1982 | Shy | 222/401 |
| 5,395,216 | 3/1995 | Lin | 417/234 |
| 5,399,072 | 3/1995 | Westphal | 417/234 |
| 5,415,353 | 5/1995 | Jackson | 239/530 |
| 5,429,306 | 7/1995 | Schneider | 238/154 |
| 5,494,191 | 2/1996 | Benson | 222/23 |
| 5,509,577 | 4/1996 | Benson | 222/61 |
| 5,553,780 | 9/1996 | Gjerde | 239/71 |
| 5,636,791 | 6/1997 | Leer | 239/154 X |
| 5,639,226 | 6/1997 | Boutrup et al. | 417/411 |
| 5,695,121 | 12/1997 | Stillions, Jr. et al. | 239/126 |
| 5,723,710 | 2/1988 | Lucore, II | 239/124 |
| 5,931,207 | 8/1999 | Gianino | 141/382 |

RELEASE MECHANISM FOR A BATTERY POWERED WHEELED GARDEN SPRAYER

CROSS-REFERENCE TO RELATED APPLICATIONS

This application is a continuation-in-part of U.S. patent application 08/957,877, filed Aug. 20, 1997.

BACKGROUND OF THE INVENTION

1. Field of the Invention

The disclosed invention relates to portable sprayers of pressurized liquids, and in particular to a release mechanism for de-pressurizing a sprayer tank and unlocking the sprayer tank with respect to a pump head.

2. Background of Related Art

Pressurized sprayers of various types are currently available on the market. Generally, the available sprayers suffer from many disadvantages. Most portable sprayers are either limited in capacity or are difficult to maneuver. Furthermore, many currently available sprayers require manual pumping and thus are difficult to use. Various types of sprayers, as described below, are currently known in the art.

U.S. Pat. No. 4,925,105 to Lin discloses a rechargeable battery powered garden sprayer. The user can hold the sprayer with a strap or handle.

U.S. Pat. No. 5,014,884 to Wunsch discloses a spray container having a piston or gear pump. The pump is used to pump the fluid out of the container rather than to pressurize the tank.

U.S. Pat. No. 4,618,099 to Nagao et al. discloses an electric spraying device having a pump and a motor. The tank can be carried by its handle.

U.S. Pat. No. 4,135,669 to Bridges et al. discloses a wheeled sprayer with a pressurized liquid reservoir.

U.S. Pat. No. 4,651,903 to Pagliai discloses a motorized pump pressurized liquid sprayer. A vessel pressurized by the pump is centrally disposed within a container.

U.S. Pat. No. 5,072,884 to Ellison et al. discloses a garden sprayer having an elliptically shaped wand and a manual pump.

U.S. Pat. No. 4,881,687 to Ballu discloses a portable liquid sprayer having a manually operated pump.

U.S. Pat. No. 3,901,449 to Bochmann discloses a portable sprayer having a handle and a pump powered by rechargeable batteries.

U.S. Pat. No. 5,150,837 to Ferrari discloses a backpack sprayer with a manually operated pump.

U.S. Pat. No. 4,787,560 to DeYoreo discloses a portable liquid sprayer with two handles.

SUMMARY OF THE INVENTION

An object of embodiments of the present invention is to provide a mechanism for de-pressurizing a fluid tank prior to disconnecting the fluid tank from a pump unit and for de-pressurizing a fluid tank automatically when a predefined threshold pressure is reached.

A further object of embodiments of the present invention is to provide a mechanism for locking and unlocking the connection between a fluid tank and a pump unit.

A further object of the embodiments of the present invention is to provide a portable sprayer having a mechanism for locking the connection between a fluid tank and a pump unit, and for unlocking the connection and de-pressuring the fluid tank prior to disconnecting the fluid tank from the pump unit.

A further object of embodiments of the present invention is to provide a method of disconecting a fluid tank from a pump unit comprising de-pressurizing the fluid tank before it is disconnected from the pump unit.

The foregoing and further objects have been achieved according to embodiments of the present invention comprising a pressure relief mechanism including a first portion and a second portion, relatively displaceable with respect to one another to open an air passage and allow venting; wherein movement of the first portion relative to the second portion causes pressure relief and substantially simultaneously causes unlocking of the lid; and movement of the second portion relative to the first portion causes venting without unlocking of the lid.

Further objects of the invention are achieved by providing an apparatus for disconnecting a pump unit from a tank, wherein the pump unit and tank are releasably connected and wherein tank pressure is relieved prior to disconnecting the pump unit and the tank. The apparatus comprises: a pressure relief mechanism comprising a first portion and a second portion relatively displaceable with respect to one another, wherein when the first portion is moved relative to the second portion, an air passage is opened between the first portion and the second portion to cause pressure relief; a latch operatively connected with the first portion, such that when the first portion is moved relative to the second portion, the latch unlocks the pump unit with respect to the tank such that the pump unit and tank become relatively rotatable simultaneously with pressure relief.

Further objects of the invention are achieved by providing a pressure relief assembly for preventing a pressurized vessel from exceeding a pre-defined threshold pressure, the pressure relief assembly comprising: a piston for operating a pressure relief device, a housing having an opening configured to restrict movement of the piston in a first direction and allow movement of the piston in a second direction. When the pressurized vessel exceeds the pre-defined threshold pressure limit, automatic movement of the piston in the second direction causes venting to relieve pressure in the pressurized vessel.

Other embodiments of the present invention comprise a slide that is translatable with respect to a pump unit; a latch that is fixed to the slide for engaging a tank, thereby locking the pump unit against relative rotation with respect to the tank, and for disengaging the tank thereby unlocking the pump unit and allowing relative rotation with respect to the tank; a slot that is formed in the latch for receiving a projection from the tank thereby locking the pump unit with respect to said tank; a handle that is fixed to the slide and projecting outside the pump unit for translating the slide; and a pressure relief mechanism communicating with the fluid in the tank, the relief mechanism including a valve seat fixed to the slide and a valve fixed to the pump unit; wherein translating the slide from a locked position to an unlocked position separates the valve from the valve seat, thereby de-pressurizing the tank and enabling relative rotation between the pump unit and the tank, such that the pump unit can be safely disconnected from the tank.

According to embodiments of the present invention, a pump unit is disconnected from a fluid tank by displacing a mechanism relative to the pump unit thereby de-pressurizing the tank and unlocking the pump unit for relative rotation with respect to the tank; rotating the pump unit relative to the tank; and disengaging the pump unit from the tank.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
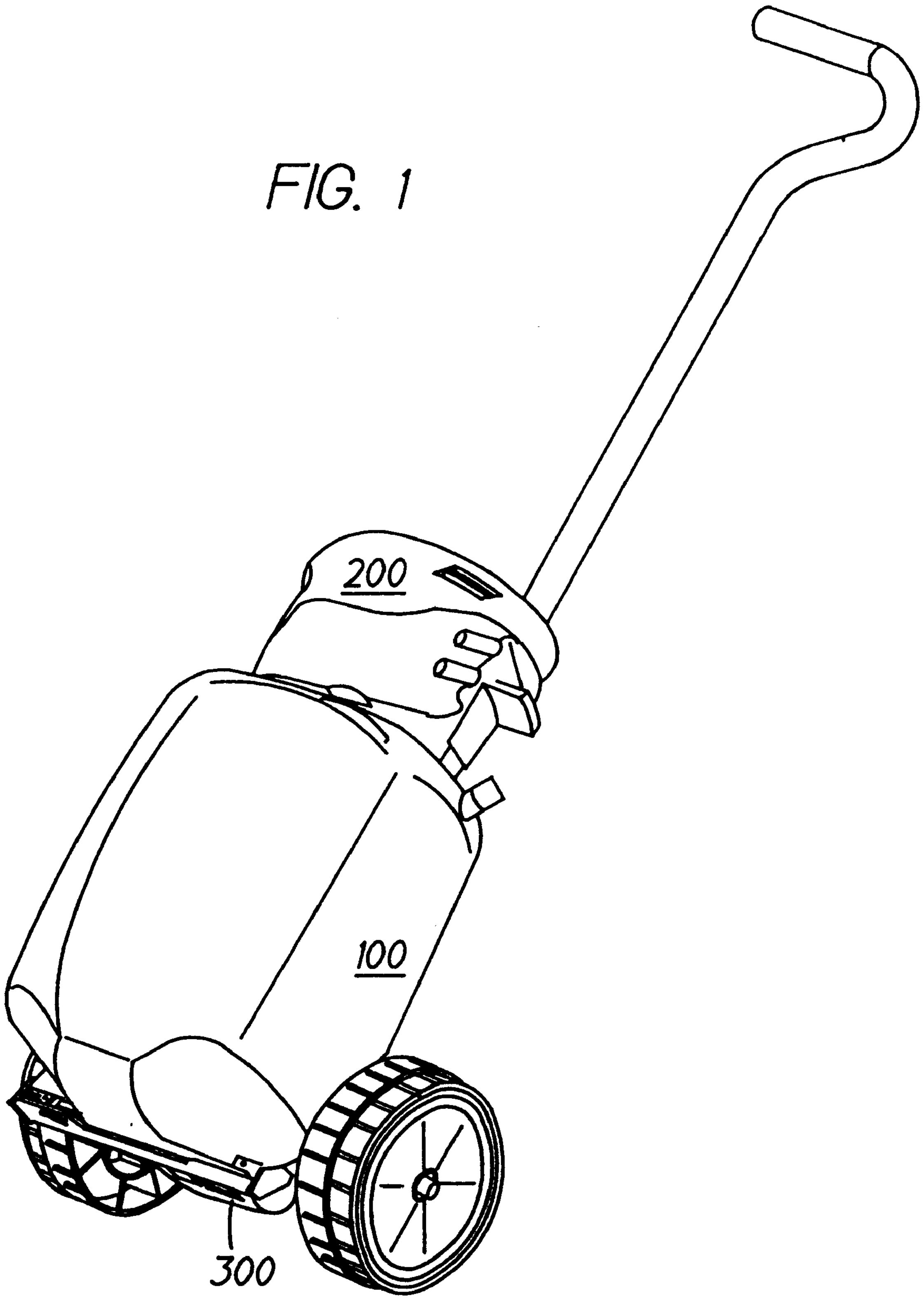
FIG. 1 is a perspective view of the sprayer assembly.

FIG. 1 is a perspective view of the sprayer assembly. Tank 100 is mounted on frame 300. Head 200 is secured to tank 100. Each of these three components is described in detail in conjunction with the drawings.

FIG. 2–7 show additional views of the sprayer assembly.

Figure 8:
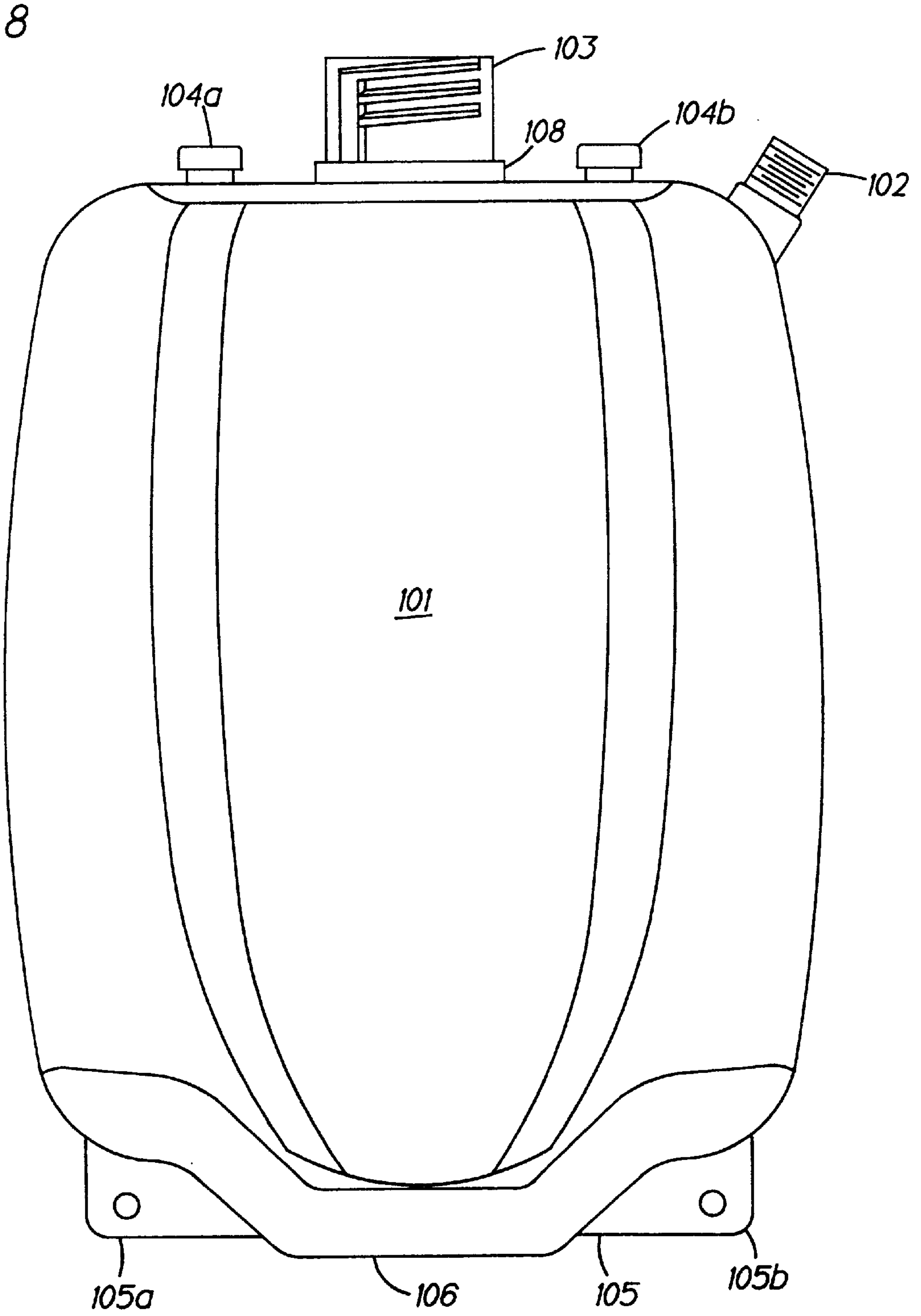
FIG. 8 is a front elevation view of the tank of the sprayer assembly.

Tank 100 as shown in FIG. 8 has a curved front wall 101. On top of front wall 101 is an externally threaded inlet 103. On the side of tank 100 is externally threaded outlet 102. Locking projections 104*a* and 104*b* are provided at the top of the tank for locking the frame to the tank. On the bottom portion of tank 100, a supporting surface 106 is shaped to be disposed adjacent the frame 300 (not shown in FIG. 8). An engaging surface 105 includes tabs 105*a* and 105*b* that are provided for engagement with the frame 300.

Figure 9:
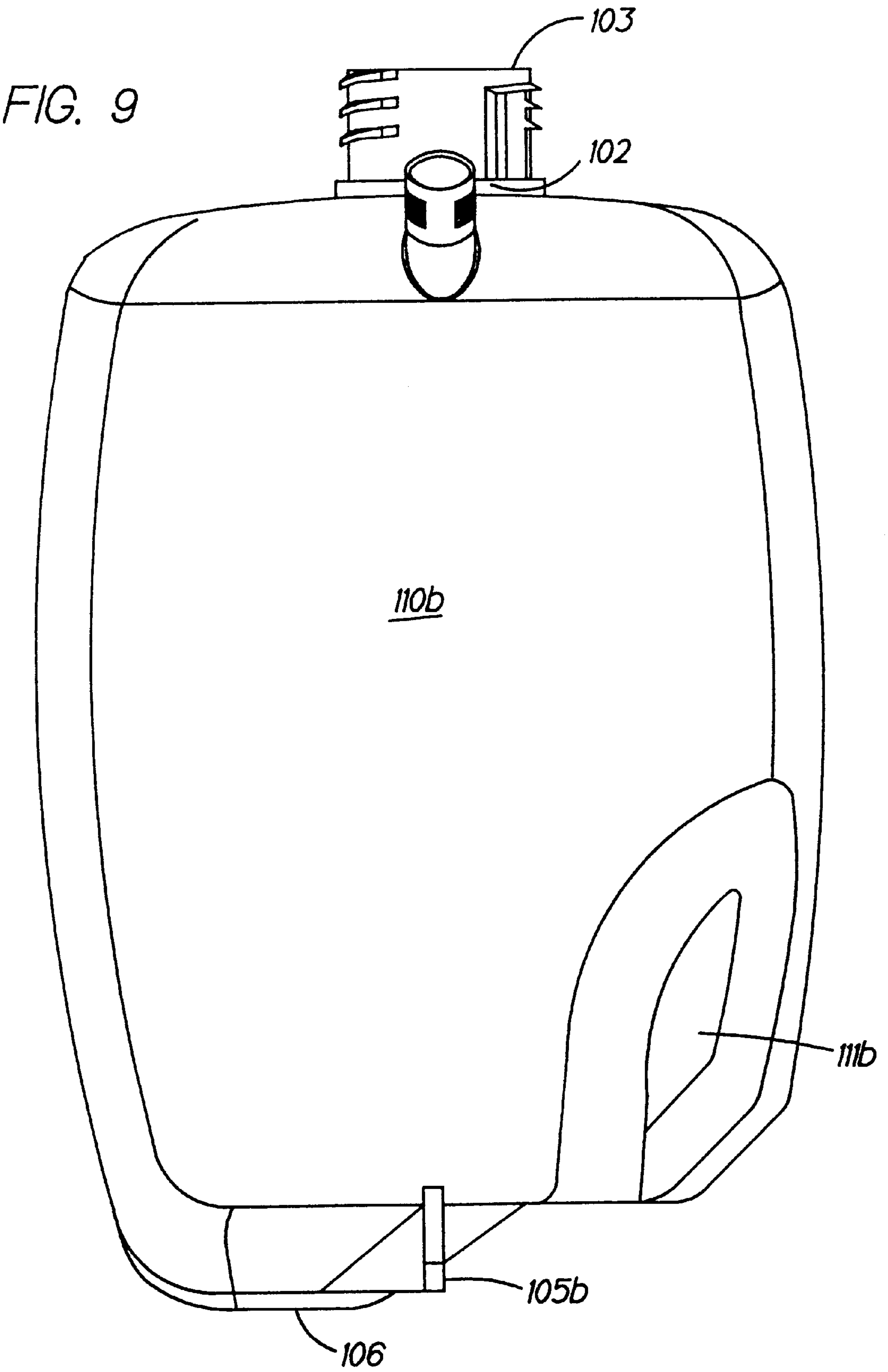
FIG. 9 is a right-side elevation view of the tank of the sprayer assembly.
Figure 10:
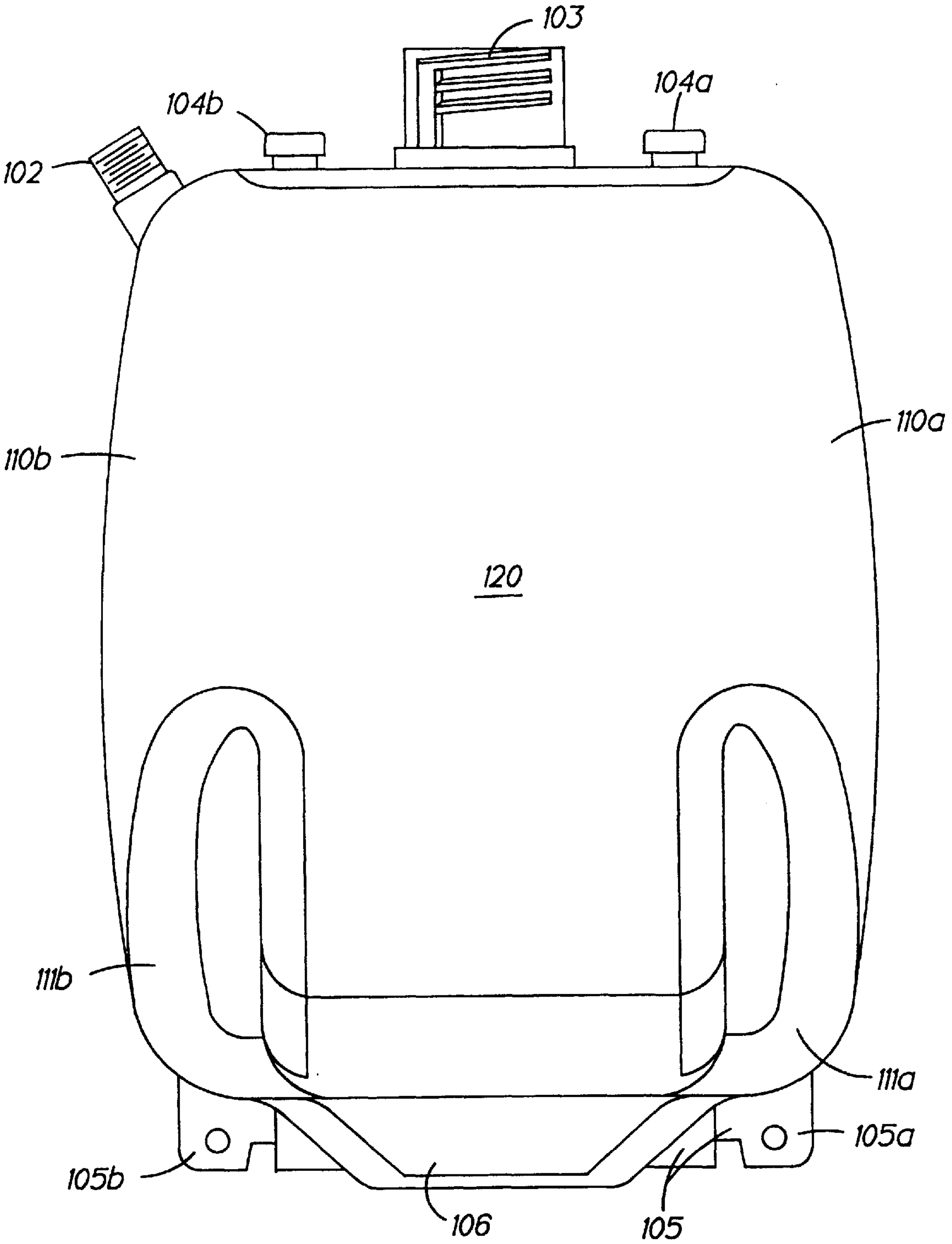
FIG. 10 is a rear elevation view of the tank of the sprayer assembly.

FIG. 9 is a side elevation of tank 100, which additionally shows wheel well 111*b* within sidewall 110*b*. FIG. 10 is a rear elevation of the tank that shows both wheel wells 111*a* and 111*b*. The wheel wells extend forward from rear wall 120.

Figure 11:
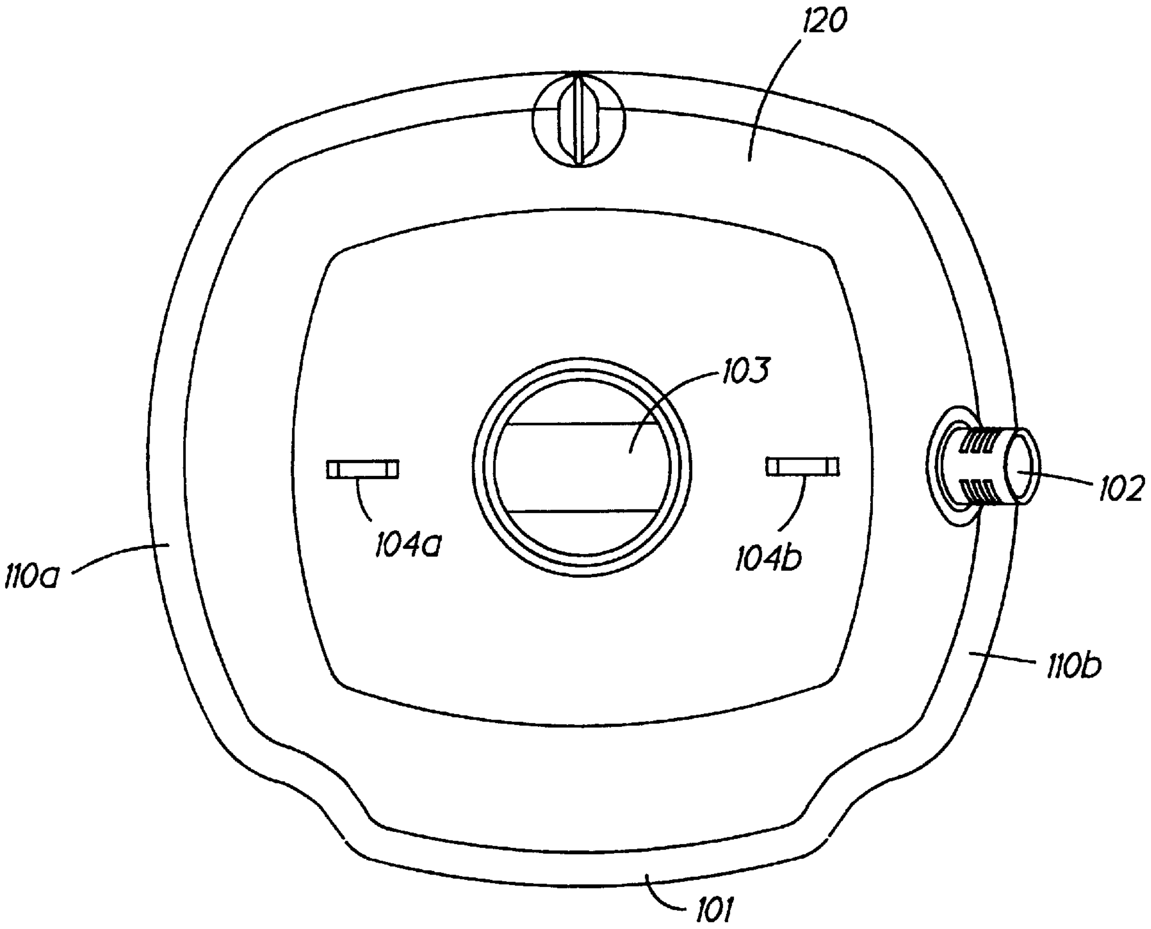
FIG. 11 is a top plan view of the tank of the sprayer assembly.

FIG. 11 is a top plan view of the tank that shows the outline of tank 100. The tank has four sidewalls 101, 110*a*, 110*b*, and 120 and each wall is of a curved configuration.

The walls of tank 100 are formed such that a safe failure mode is provided for the tank. The thickness of the walls is varied such that the walls are thinnest at the top of the tank. Preferably, the thinner wall portions are formed at the top of the tank, under a connecting portion of the frame shown in FIG. 14. Accordingly, if failure occurs, no leakage will occur from the bottom of the tank. Further, the provision of a safe failure mode allows most portions of the tank to be thinner than would otherwise be required.

Figure 12:
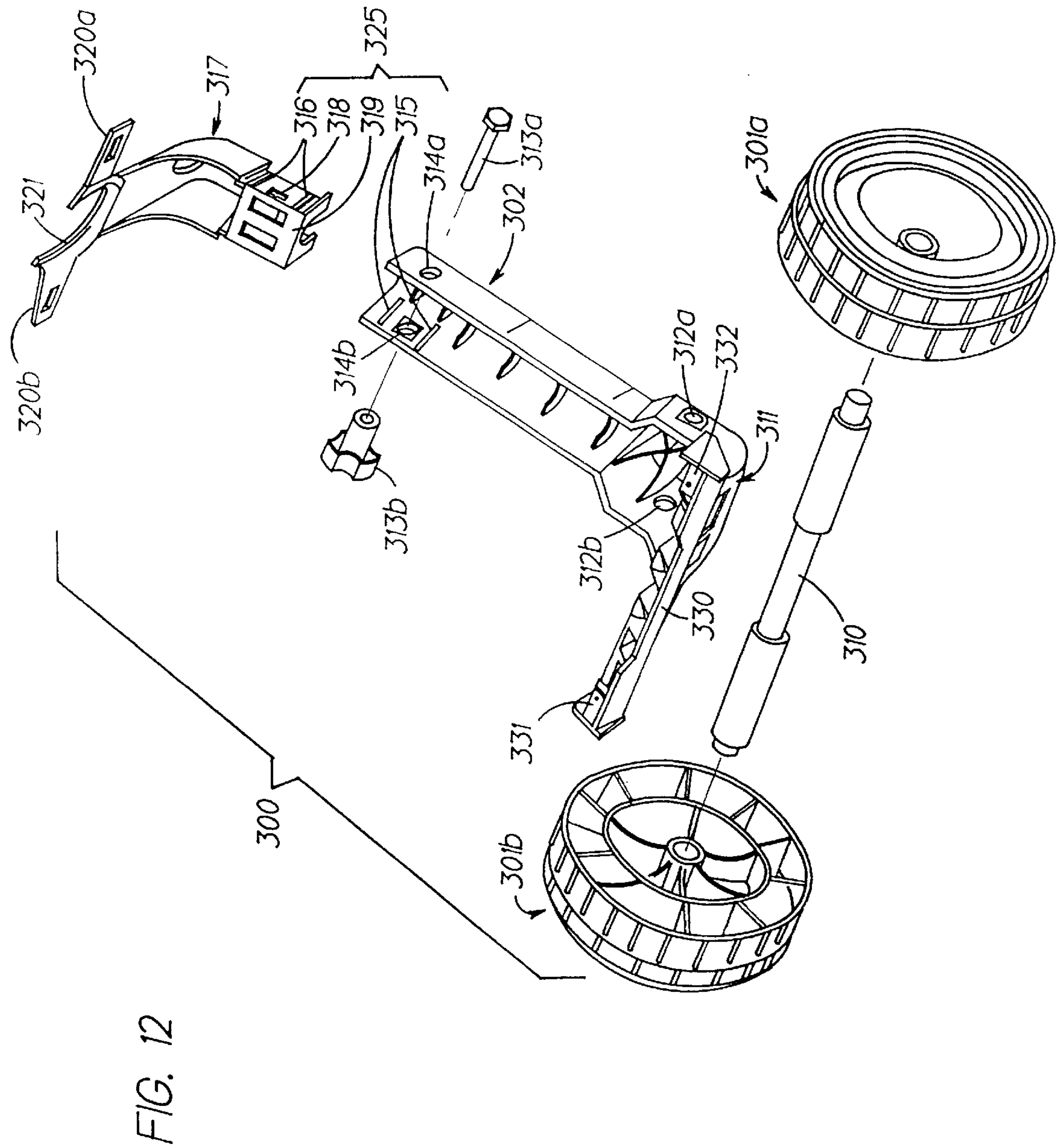
FIG. 12 is an exploded perspective view of the frame of the sprayer assembly.

FIG. 12 is an exploded perspective view of frame 300. Wheels 301*a* and 301*b* are connected by axle 310. Apertures 312*a* and 312*b* receive axle 310, as is more clearly shown in FIG. 13. Supporting portion 311 extends below axle 310 (in the position shown in FIG. 12), and shaft portion 302 extends upward from supporting portion 311 and connects with upper arm 317. An interlocking connection between shaft 302 and upper arm 317 is accomplished by inserting connecting portion 319 of upper arm 317 into shaft 302 such that ribs 316 of the upper arm engage ribs 315 on shaft 302. Ribs 315 are located on both sides of shaft 302 and ribs 316 are located on both sides of upper arm 317. The connection forms interlocking joint 325 which is then secured by inserting connectors 313*a* and 313*b* (e.g. a bolt and nut) through apertures 314*a* and 314*b* in the shaft and apertures 318 in the upper arm.

Loosening connectors 313*a* and 313*b* allows the assembly a limited degree of relative displacement between shaft 302 and upper arm 317 such that frame 300 can be manipulated for easy replacement of the tank 100. Tightening the connectors 313*a* and 313*b* interlocks ribs 315 and 316 to secure frame sections 302 and 317 together, thereby securely retaining the tank 100 with respect to the frame 300.

Additionally, support portion 311 comprises an extension rib 330 that acts as an outrigger and provides an anti-tip feature. When the sprayer assembly is tilted forward, rib extension 330 of support arm 311 will touch the ground widening the sprayer's footprint, and ensuring that the sprayer's center of gravity is contained within the boundaries of the footprint.

Figure 13:
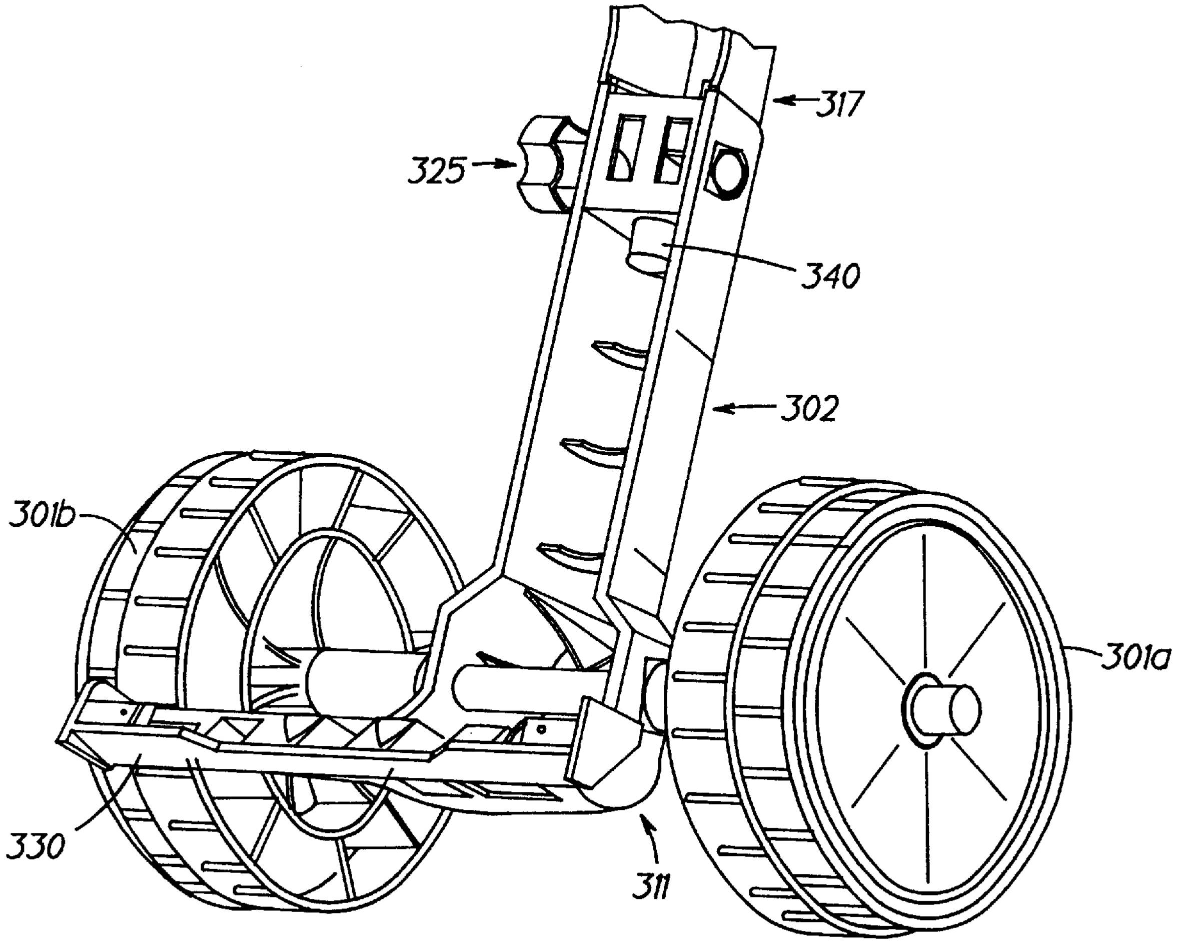
FIG. 13 is a perspective view of a lower portion of the frame of the sprayer assembly.

FIG. 13 further shows the lower portion of an elongated tube 340 integrated into joint 325 and functioning as a handle. The entire configuration of the handle is shown in FIG. 1. With connectors 313*a* and 313*b* removed, tube 340 can be moved up and down to adjust the height of the handle.

Figure 2:
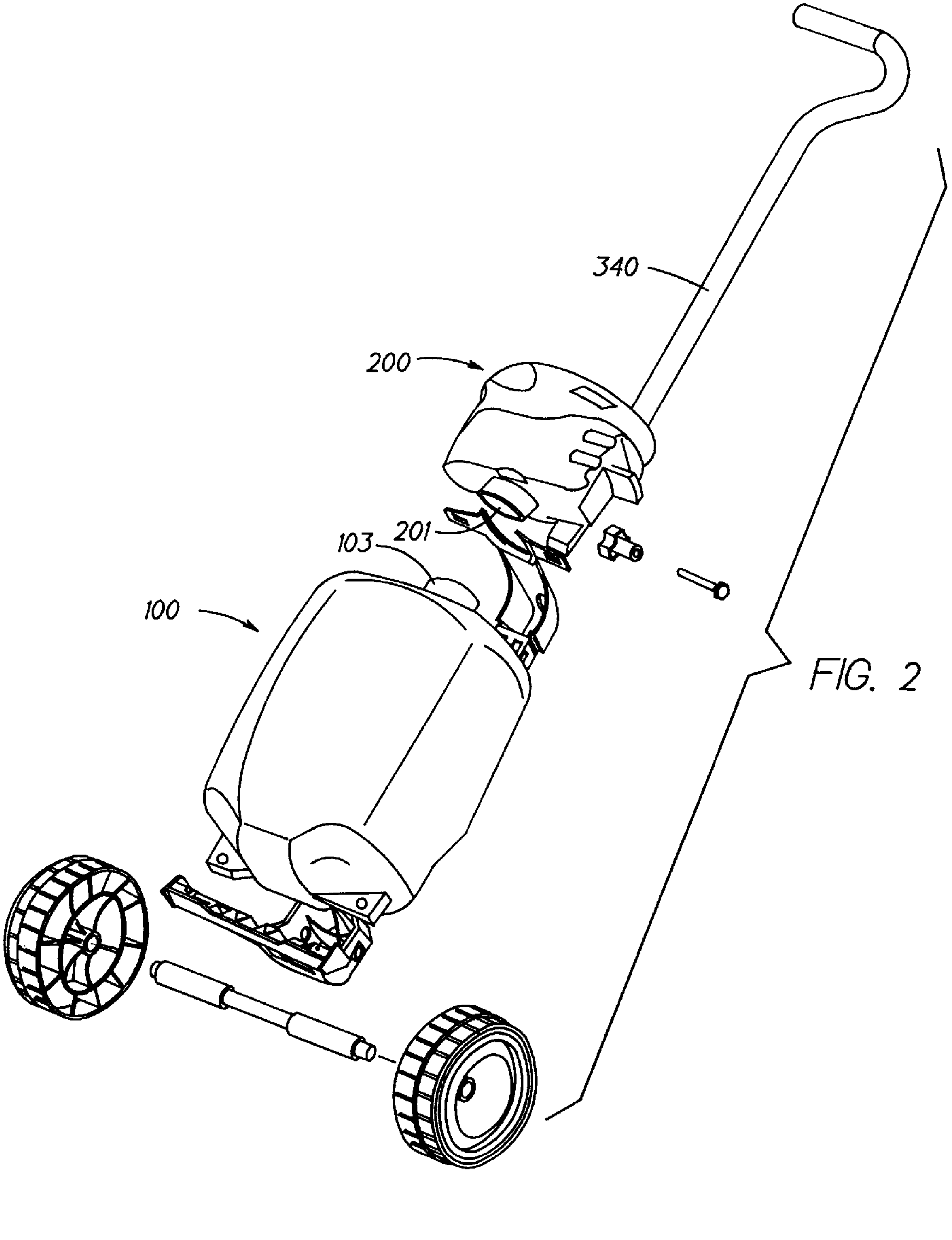
FIG. 2 is an exploded perspective view of the sprayer assembly.
Figure 3:
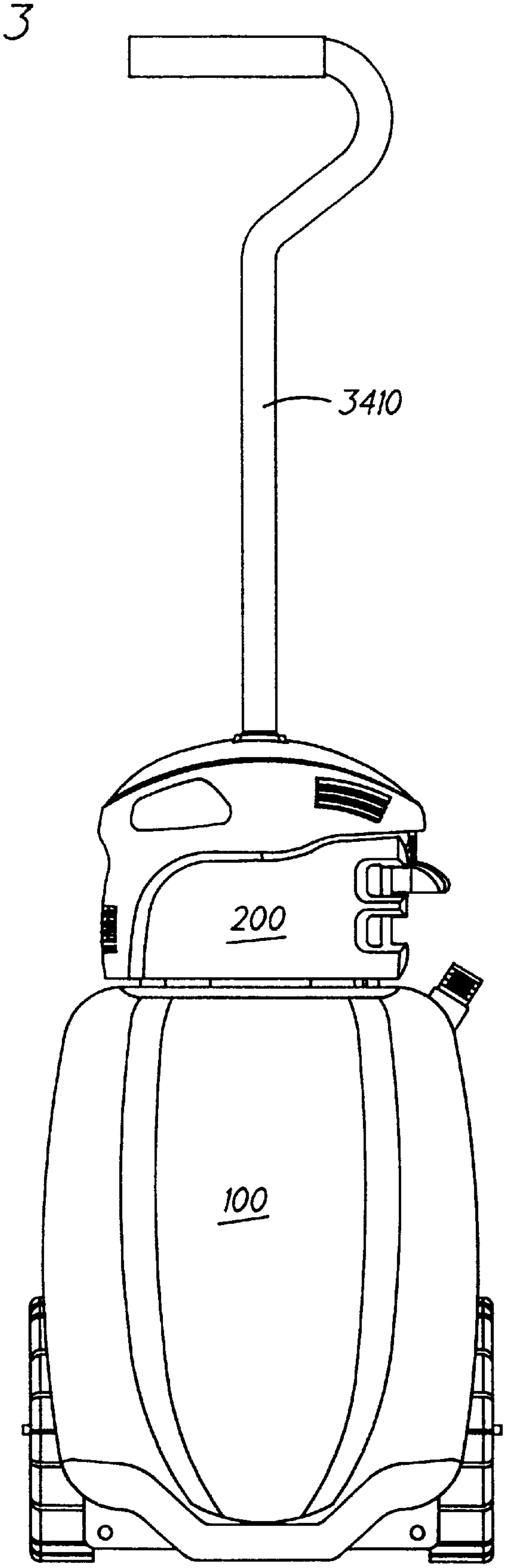
FIG. 3 is a front elevation view of the sprayer assembly.
Figure 4:
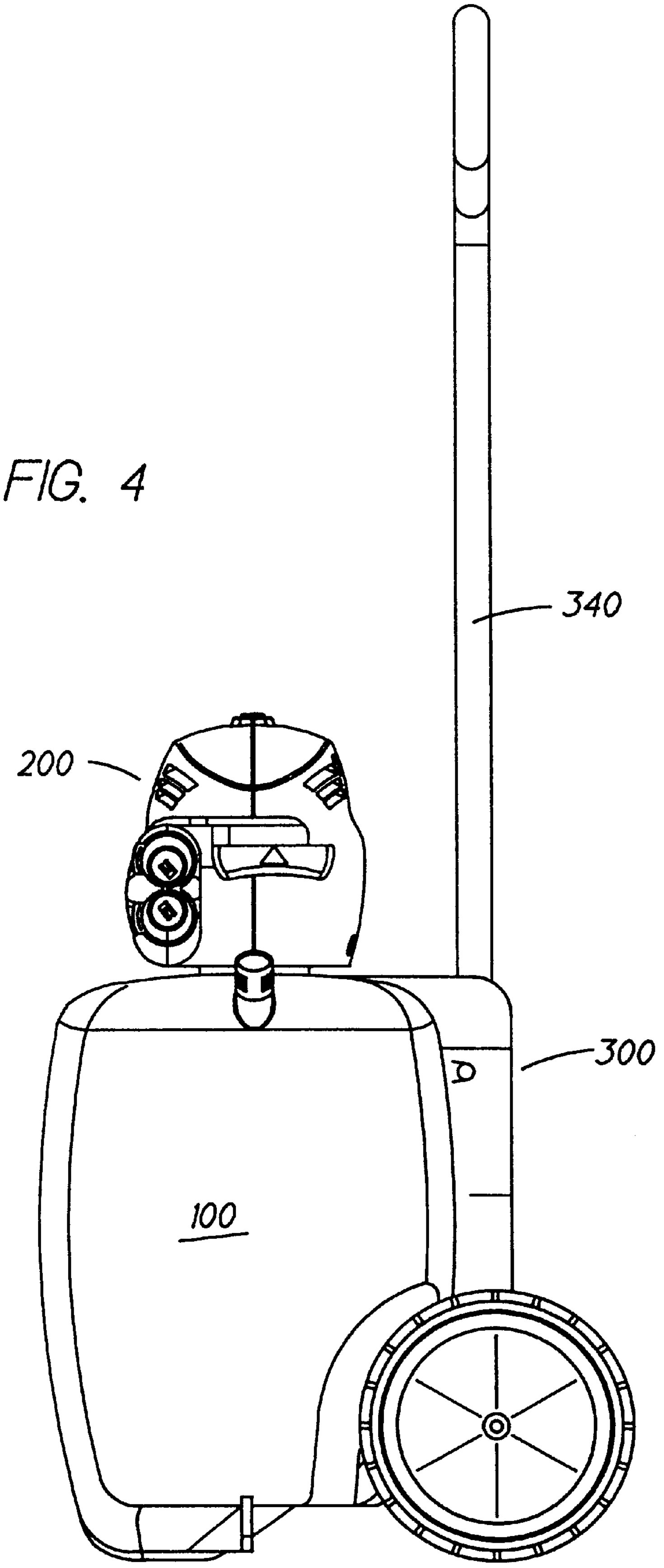
FIG. 4 is a right-side elevation view of the sprayer assembly.
Figure 5:
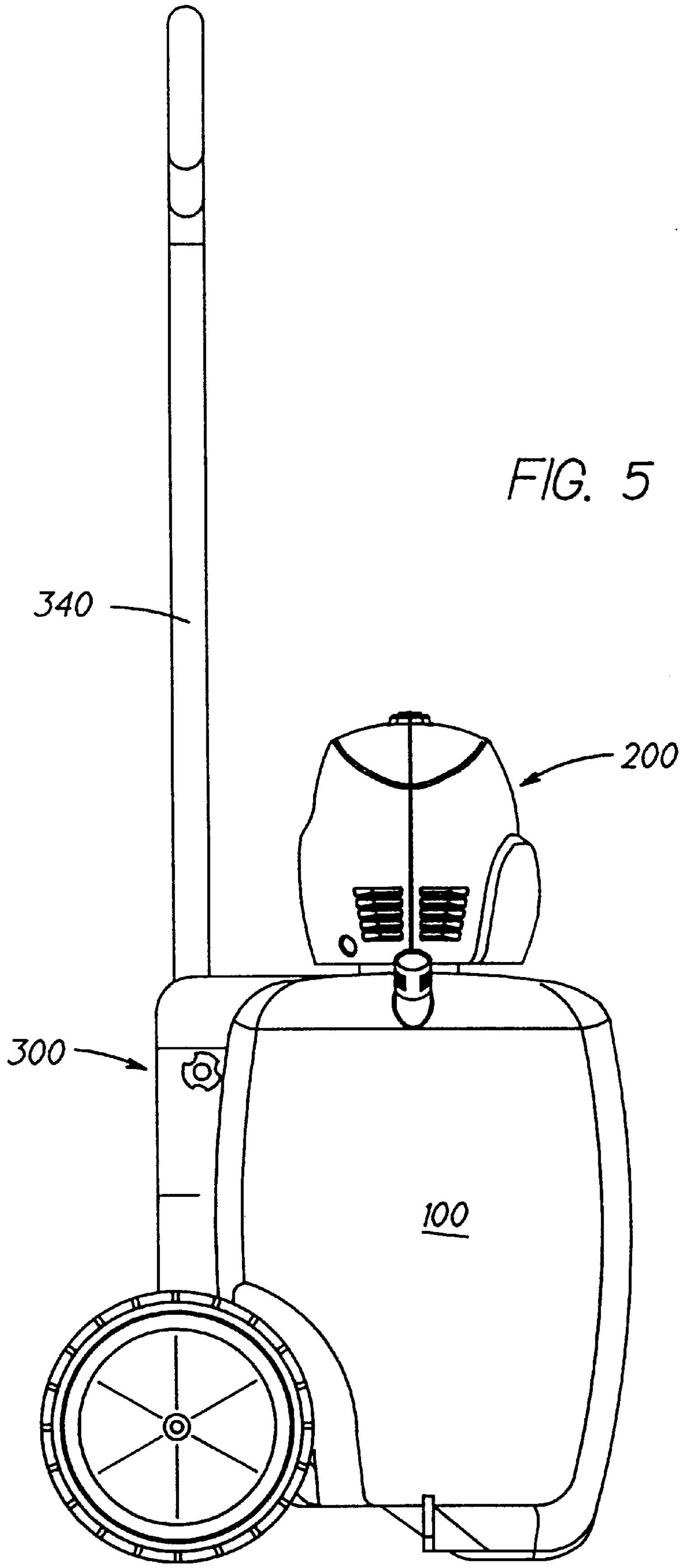
FIG. 5 is a left-side elevation view of the sprayer assembly.
Figure 6:
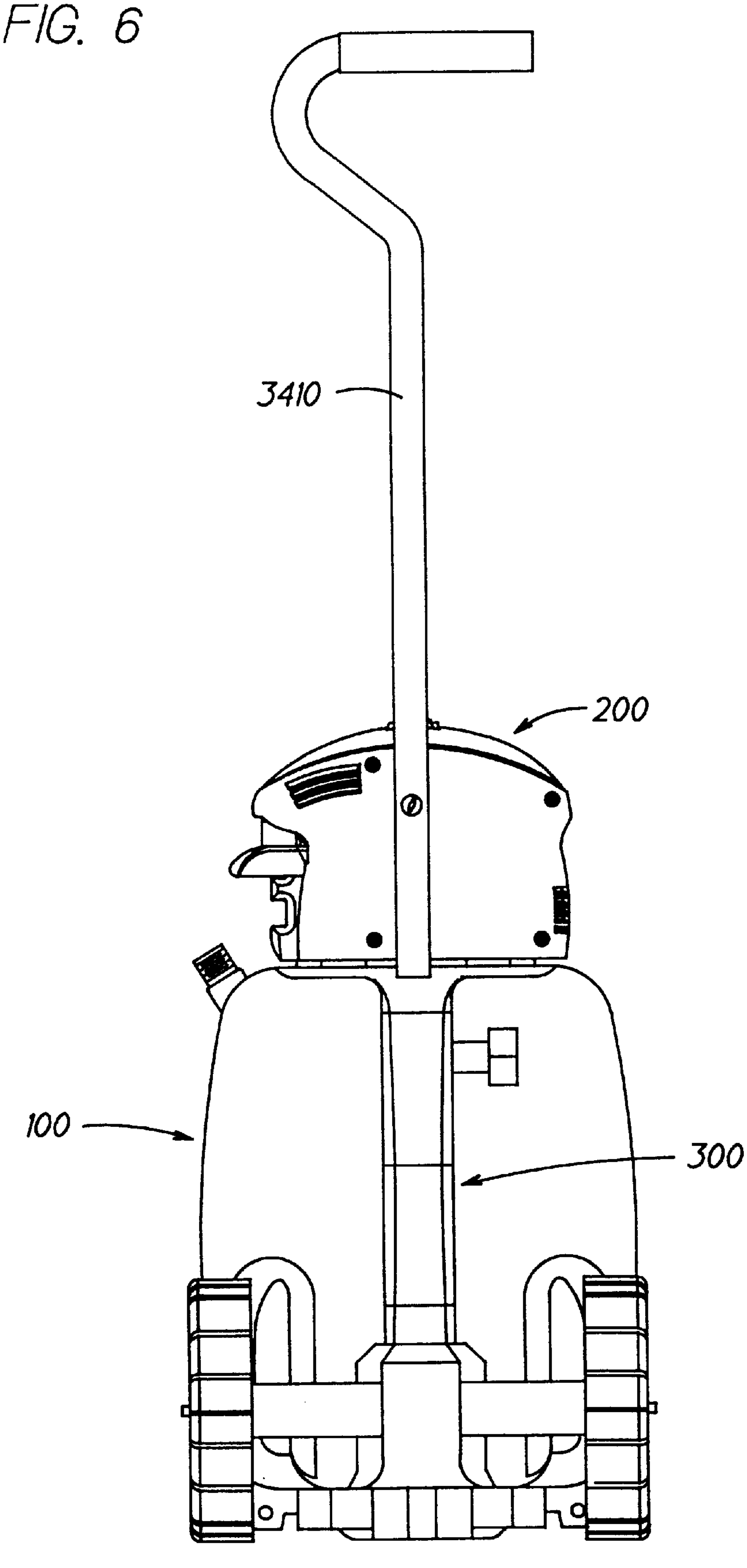
FIG. 6 is a rear elevation view of the sprayer assembly.
Figure 7:
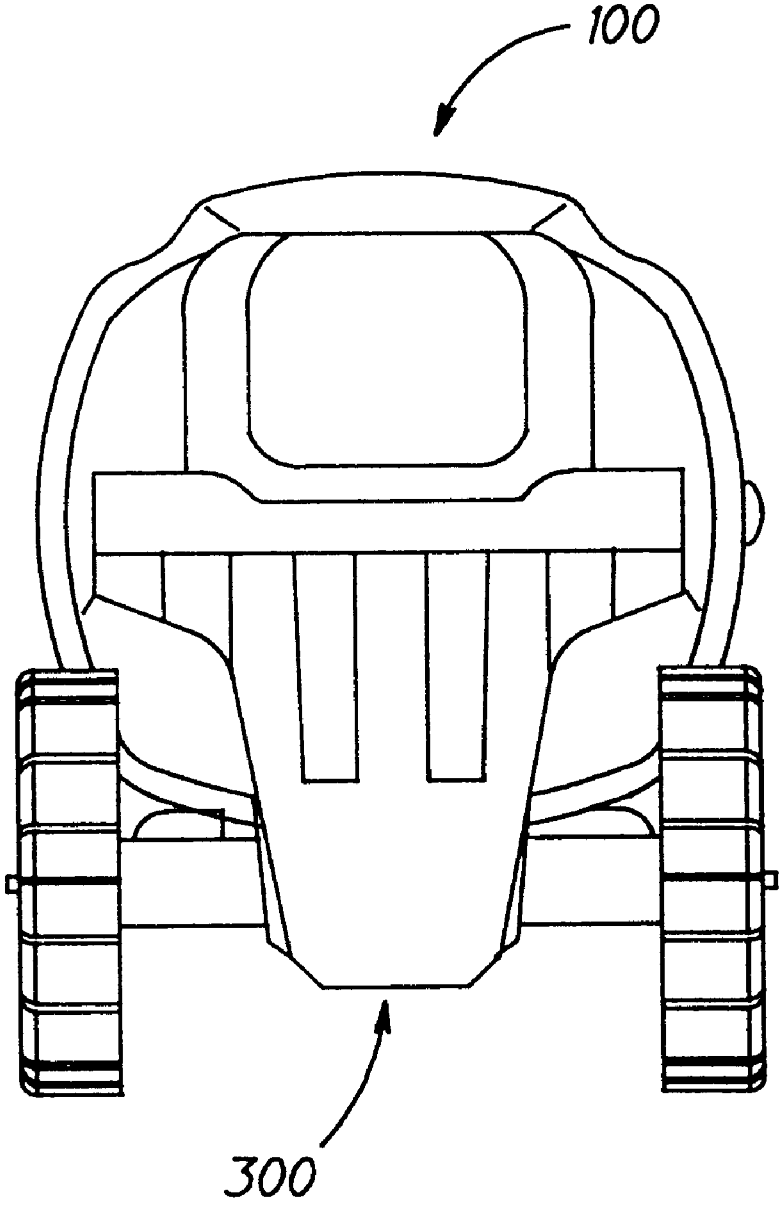
FIG. 7 is a bottom view of the sprayer assembly.

The connection between the lower portion of tank 100 and frame 300 is best understood referring to FIGS. 2, 10 and 12. The tank 100 is secured to the support portion 311 by tabs 105*a* and 105*b* near the bottom of the tank 100. The tabs 105*a* and 105*b* interlock within support arms 331 and 332 on the frame 300. Tabs 105*a* and 105*b* project downwardly and each has a hole roughly in the center of the tab. Each support arm 331 and 332 of the frame 300 has a recessed section with a pin. Each recessed section engages with a respective tank tab 105*a* and 105*b*, and the pins interlock with the holes in the tank tabs 105*a* and 105*b*.

During assembly of the sprayer, tank 100 is engaged with frame 300 by tilting the tank 100, engaging tank tabs 105*a* and 105*b* with the support arm recess at a 45 degree angle from its normal assembled position, then tilting the tank upright in the normal assembled position. Integral ribs on the frame 300 help guide the tank 100 into position during the assembly process.

Figure 14:
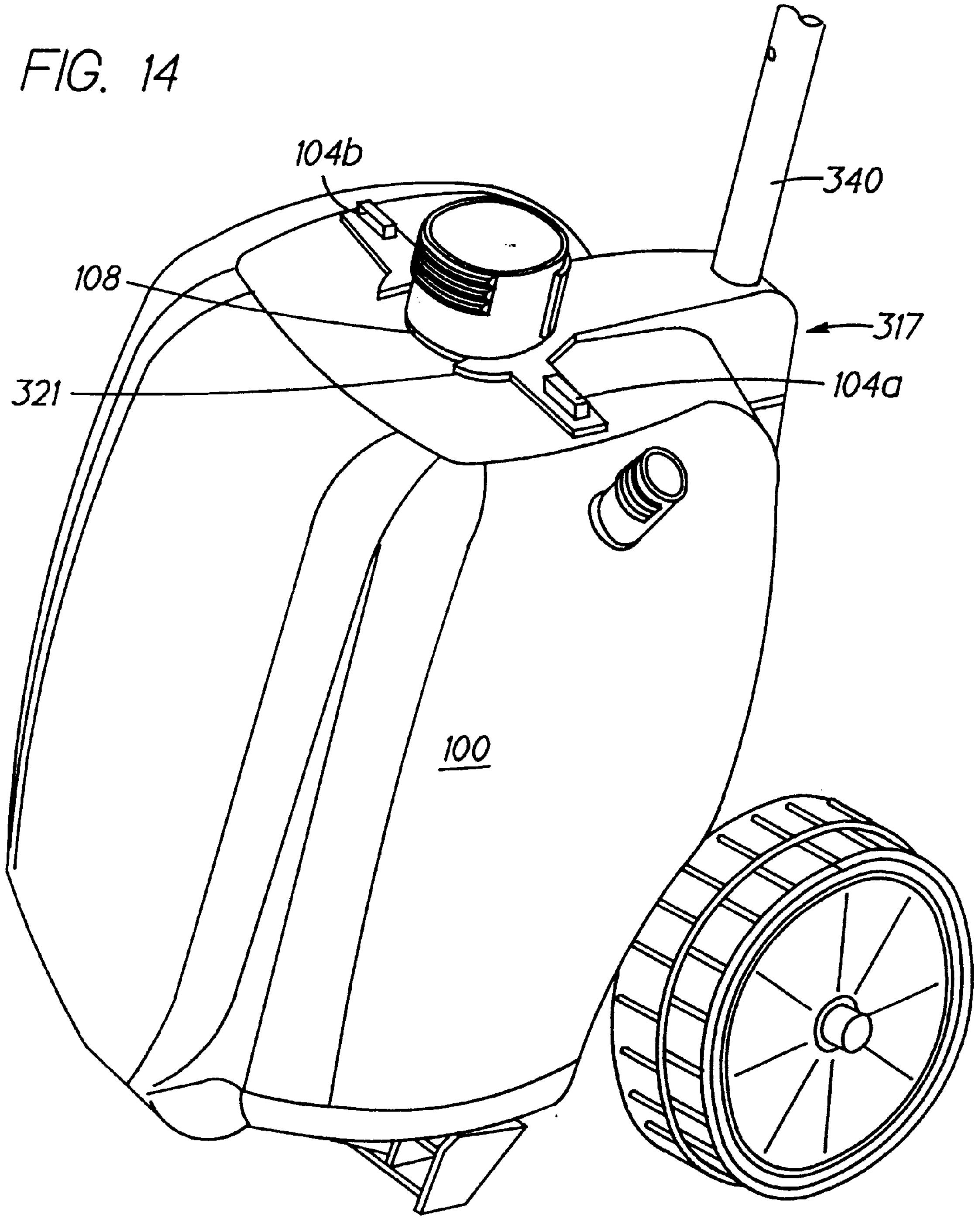
FIG. 14 is a perspective view showing the tank attached to the frame of the sprayer assembly.

As illustrated in FIG. 14, tank 100 is secured to upper arm 317 by key type openings 320*a* and 320*b* (see FIG. 12) on upper arm 317 that engage with projections 104*a* and 104*b* on tank 100. A collar 321 of upper arm 317 surrounds inlet 103 of tank 100 at inlet flange 108. Projections 104*a* and 104*b* are radially aligned on opposite sides of inlet flange collar 108, and each has a notch profile projecting through the key type openings 320*a* and 320*b* in the frame. The notches lock into the openings when the frame collar 321 is fully engaged with the corresponding inlet flange 108.

Referring to FIGS. 2, 8–11 and 23–24, power head 200 is mounted on top of tank 100. Opening 201 in power head 200 is secured onto inlet 103 of tank 100.

The design of power head 200 provides a lid such that disassembly from the tank 100 does not cause a sudden release of pressure from the tank 100. The head 200 is provided with a locking feature to ensure that once the sprayer is assembled and full pressure is attained, the head 200 must be deliberately unlocked prior to unscrewing and removing. As part of the unlocking action, there is a reduction in tank pressure prior to unscrewing. This reduction in tank pressure also reduces the effort required to unscrew the head 200.

Figure 15:
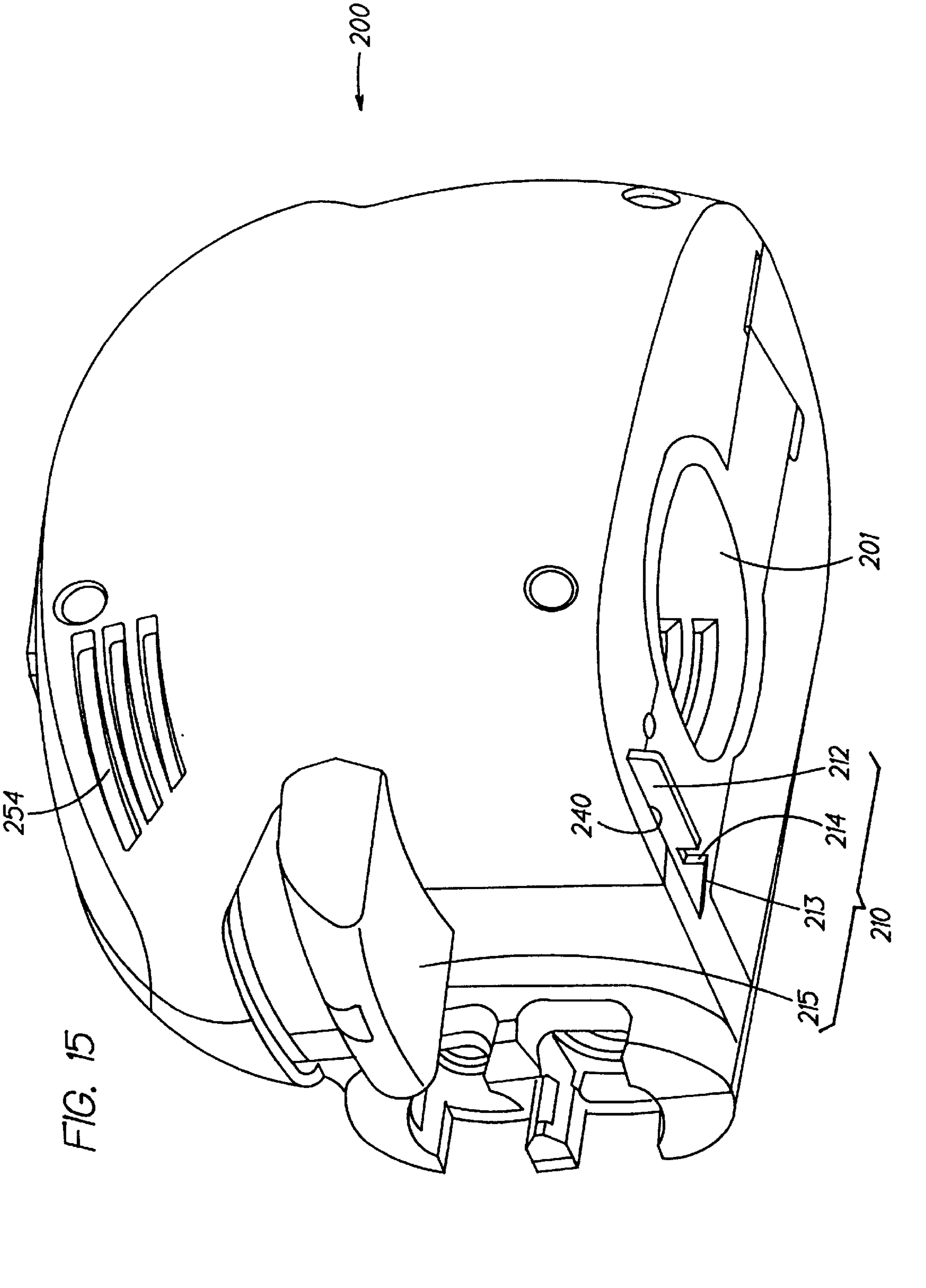
FIG. 15 is a perspective view of the power head of the sprayer assembly.
Figure 16:
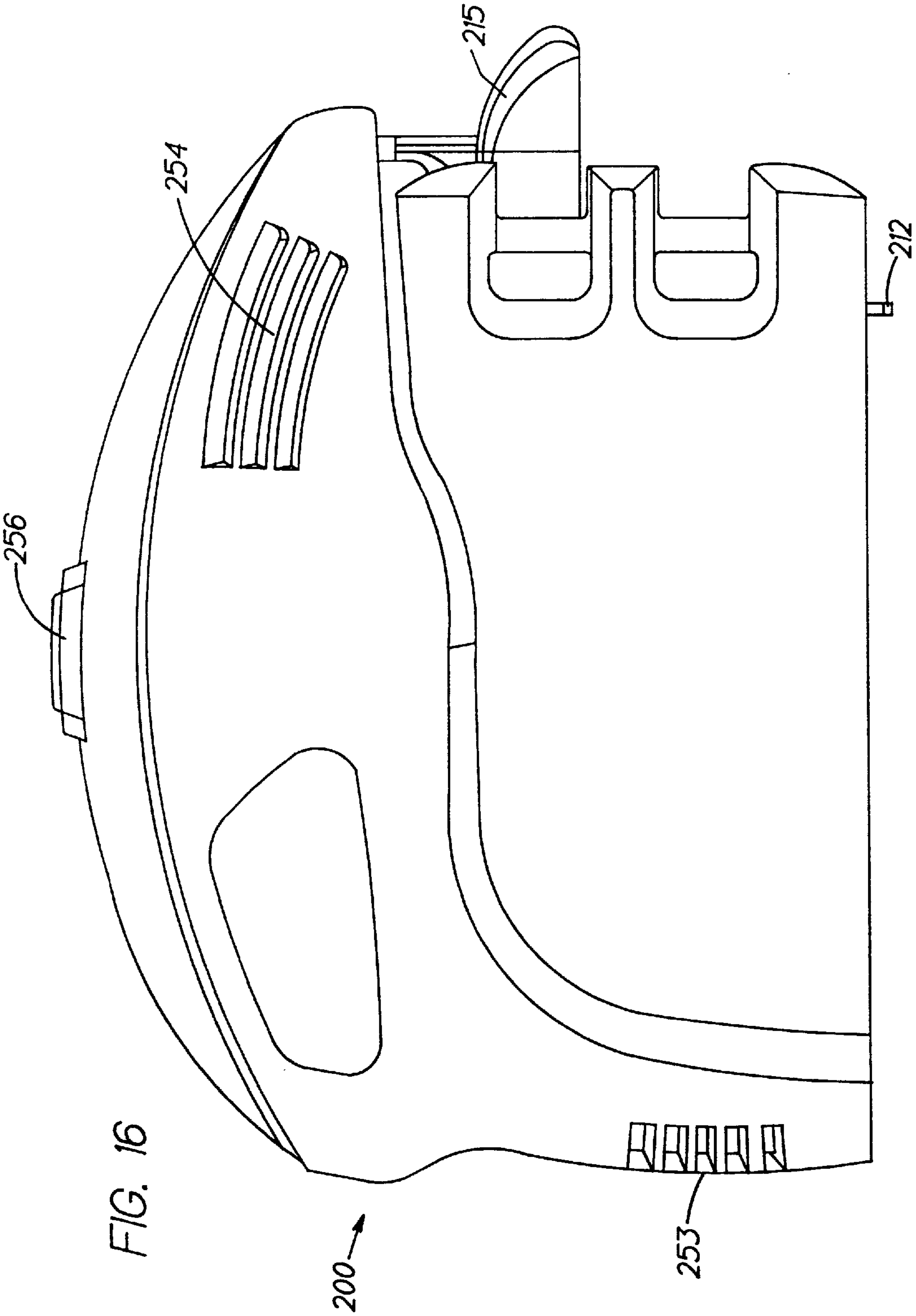
FIG. 16 is a front elevation view of the power head of the sprayer assembly.
Figure 17:
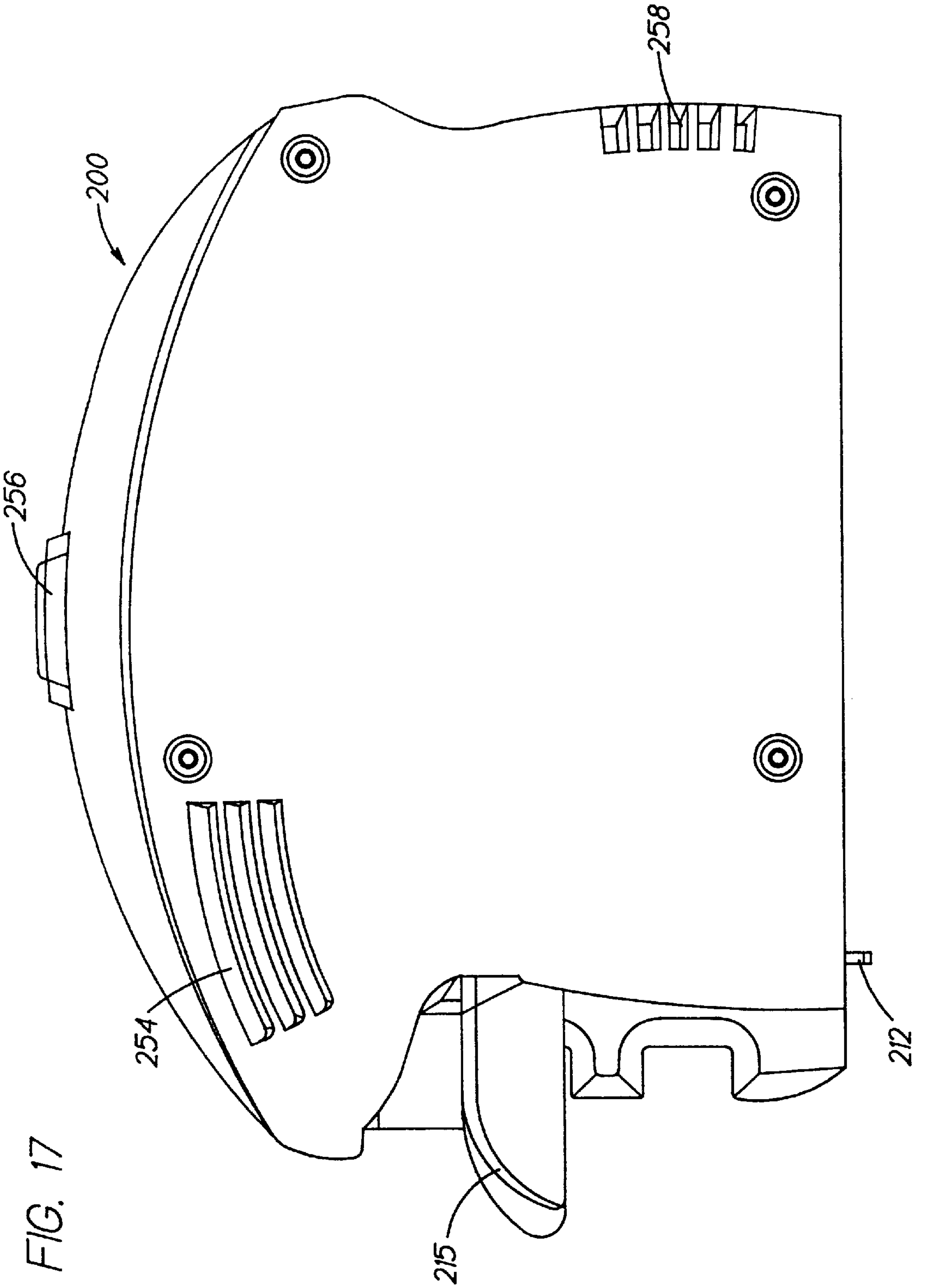
FIG. 17 is a rear elevation view of the power head of the sprayer assembly.
Figure 18:
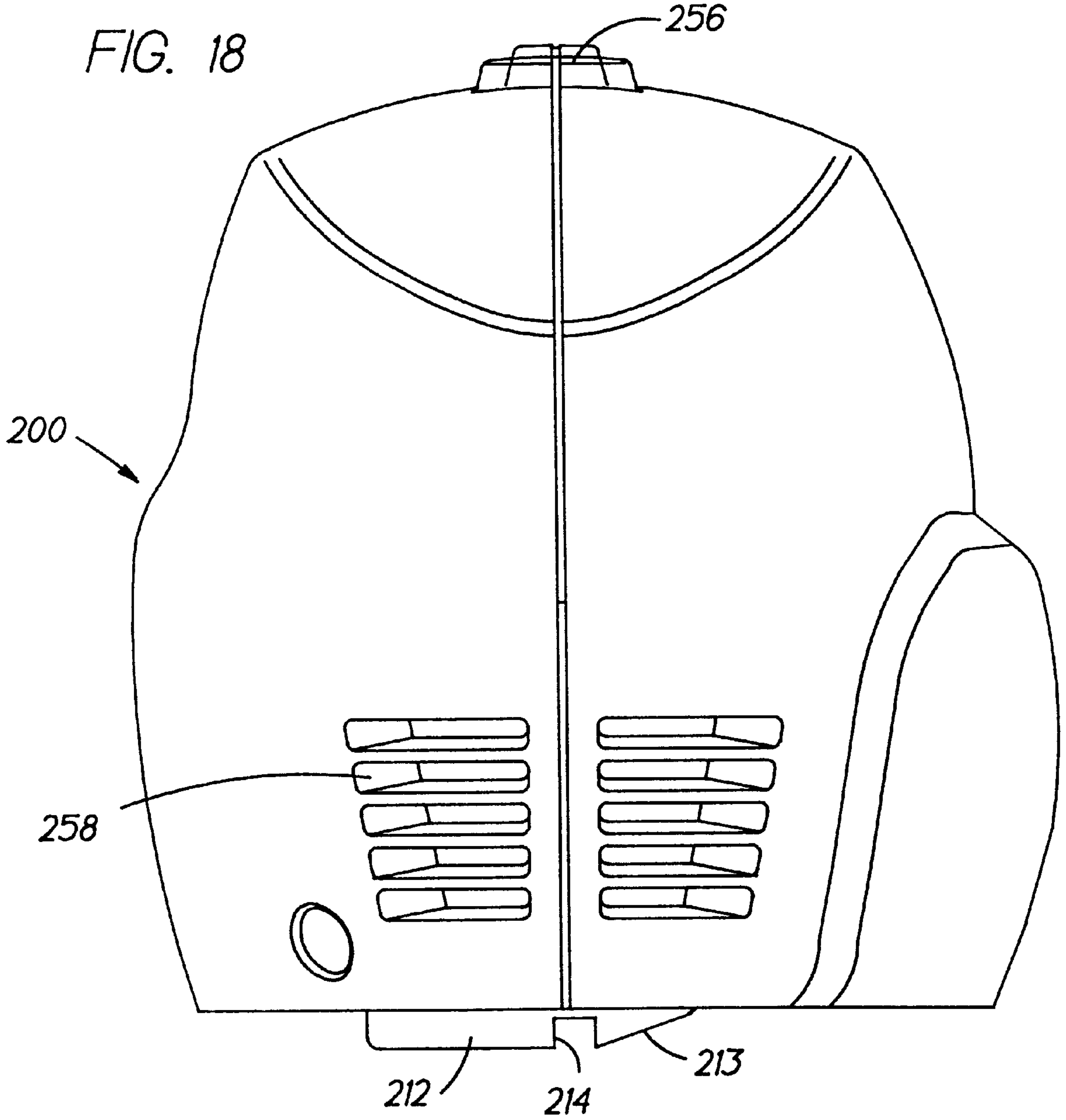
FIG. 18 is a left-side elevation of the power head of the sprayer assembly.
Figure 19:
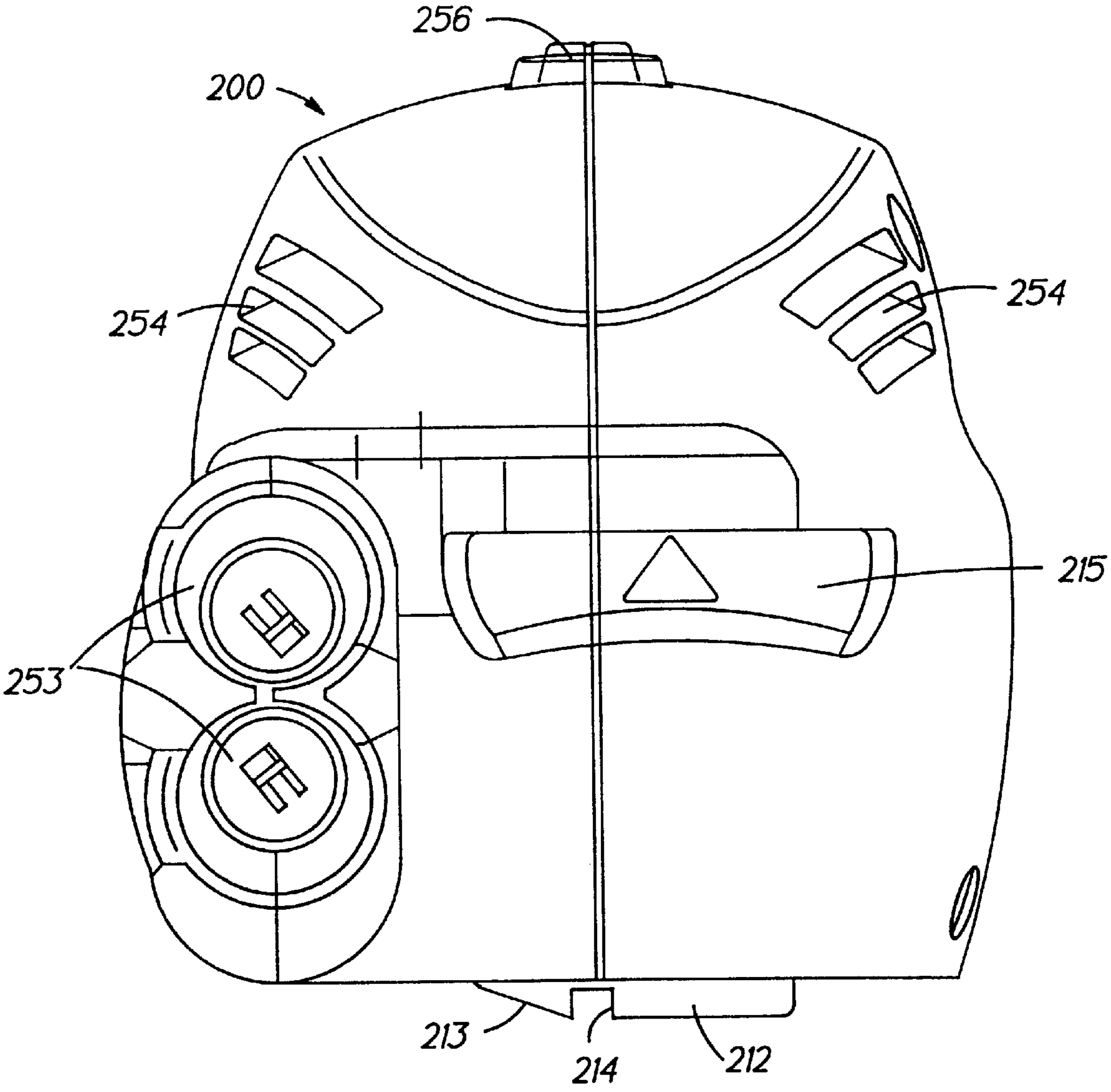
FIG. 19 is a right-side elevation of the power head of the sprayer assembly.

Referring also to FIGS. 15 and 22–28(*b*) power head 200 is equipped with a release mechanism 210. As shown in FIG. 15, release mechanism 210 includes slide 212 that retractably projects outside head 200 for interlocking with locking projections 104*a* projecting upward from tank 100. Slide 212 travels vertically within guide 240 in the housing. Leading edge 213 of slide 212 is ramped so that when head 200 is rotated into a tightened position, slide 212 will lift up slightly until the head threads are fully engaged with tank 100. When head 200 is rotated to the point of the thread stop, a slot 214 in the lever section allows slide 212 to drop down on the locking projection 104*a* of tank 100. This locks the head 200 into position. The user must lift slide 212 by extended side projection 215 to disengage slide 212 from locking projection 104*a* and unscrew head 200 from tank 100.

Figure 23:
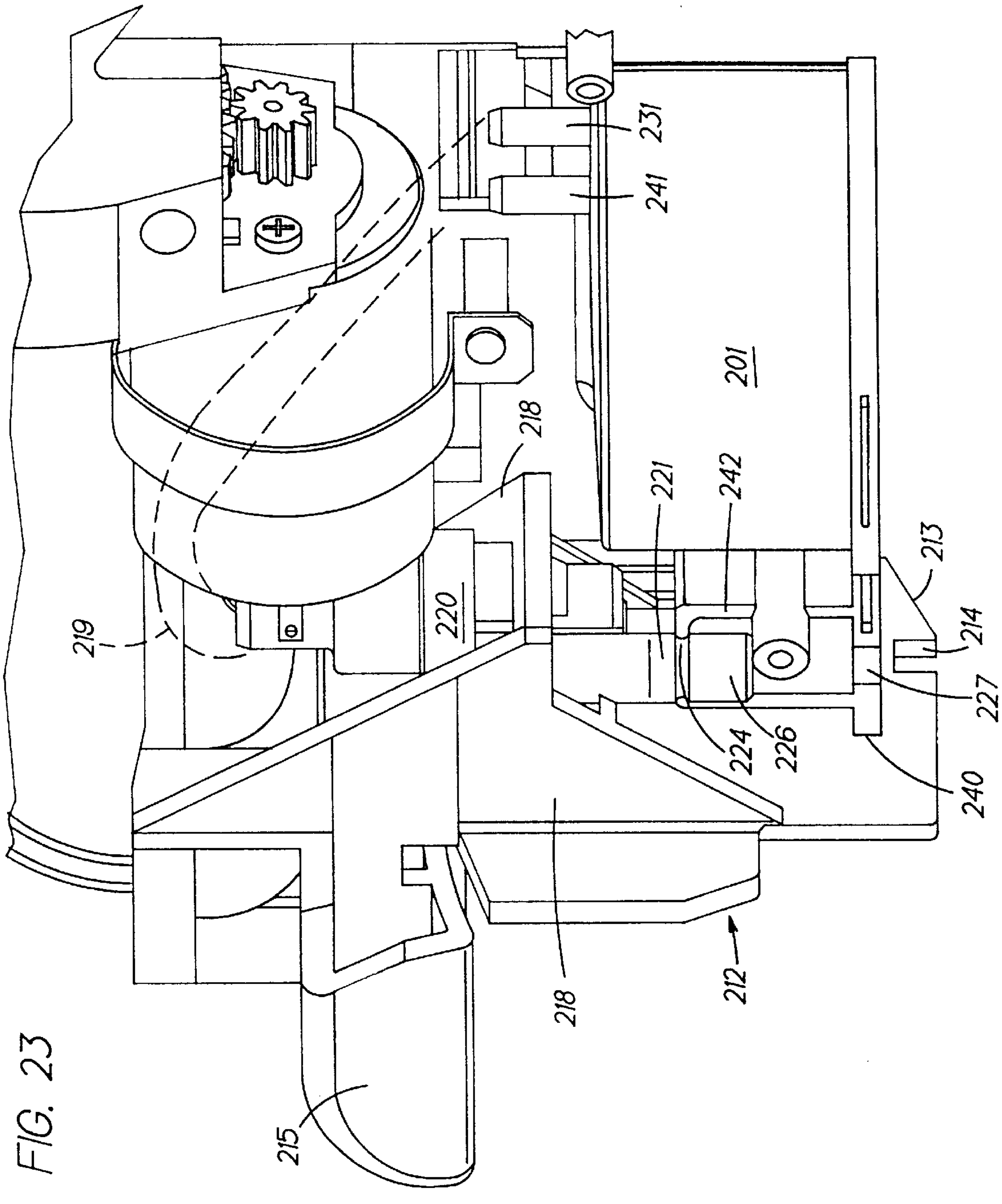
FIG. 23 is an additional perspective view showing the interior of the power head.
Figure 24:
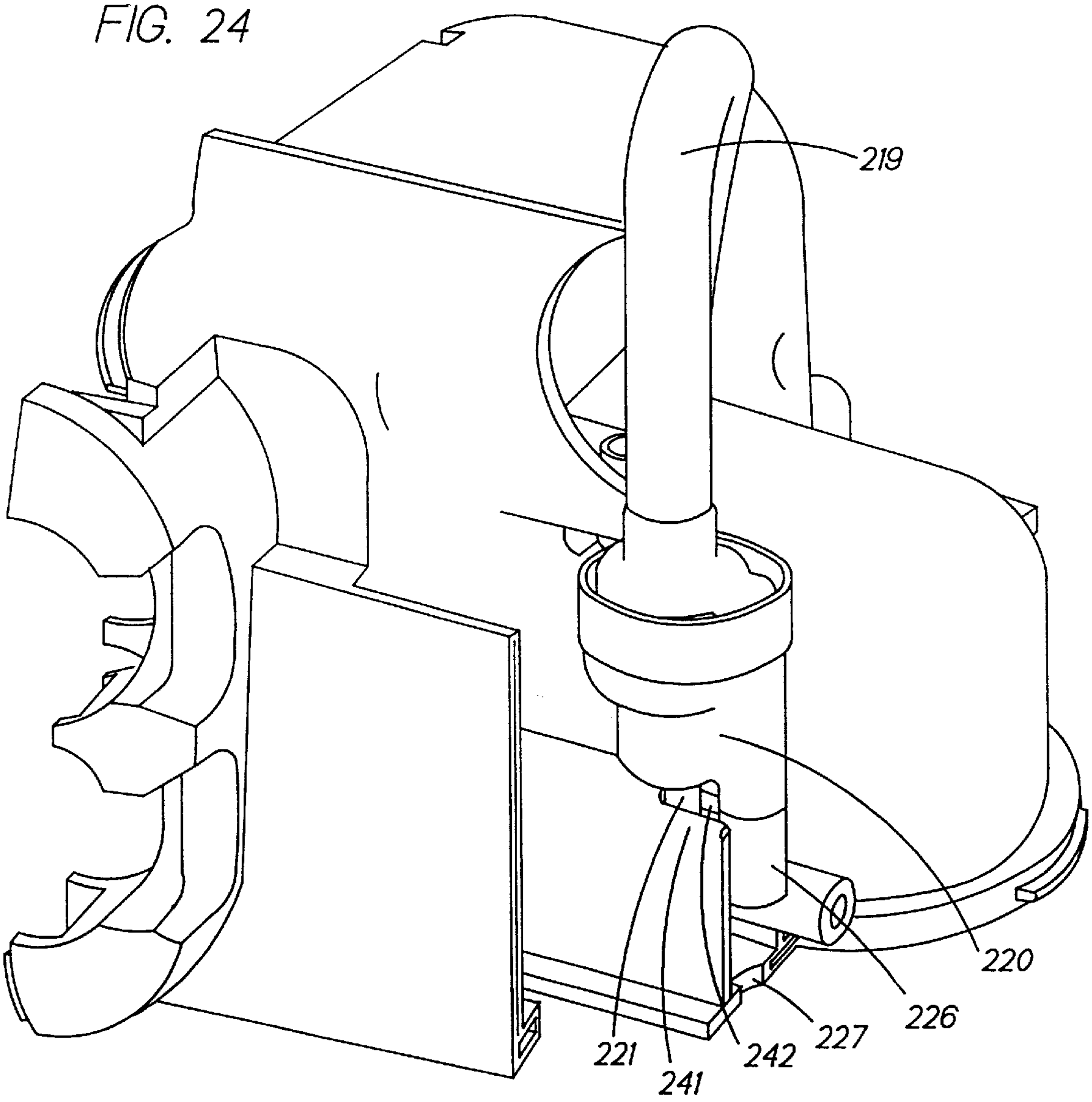
FIG. 24 is a perspective view showing a state of assembly in which the pressure relief mechanism is clearly visible.
Figure 25:
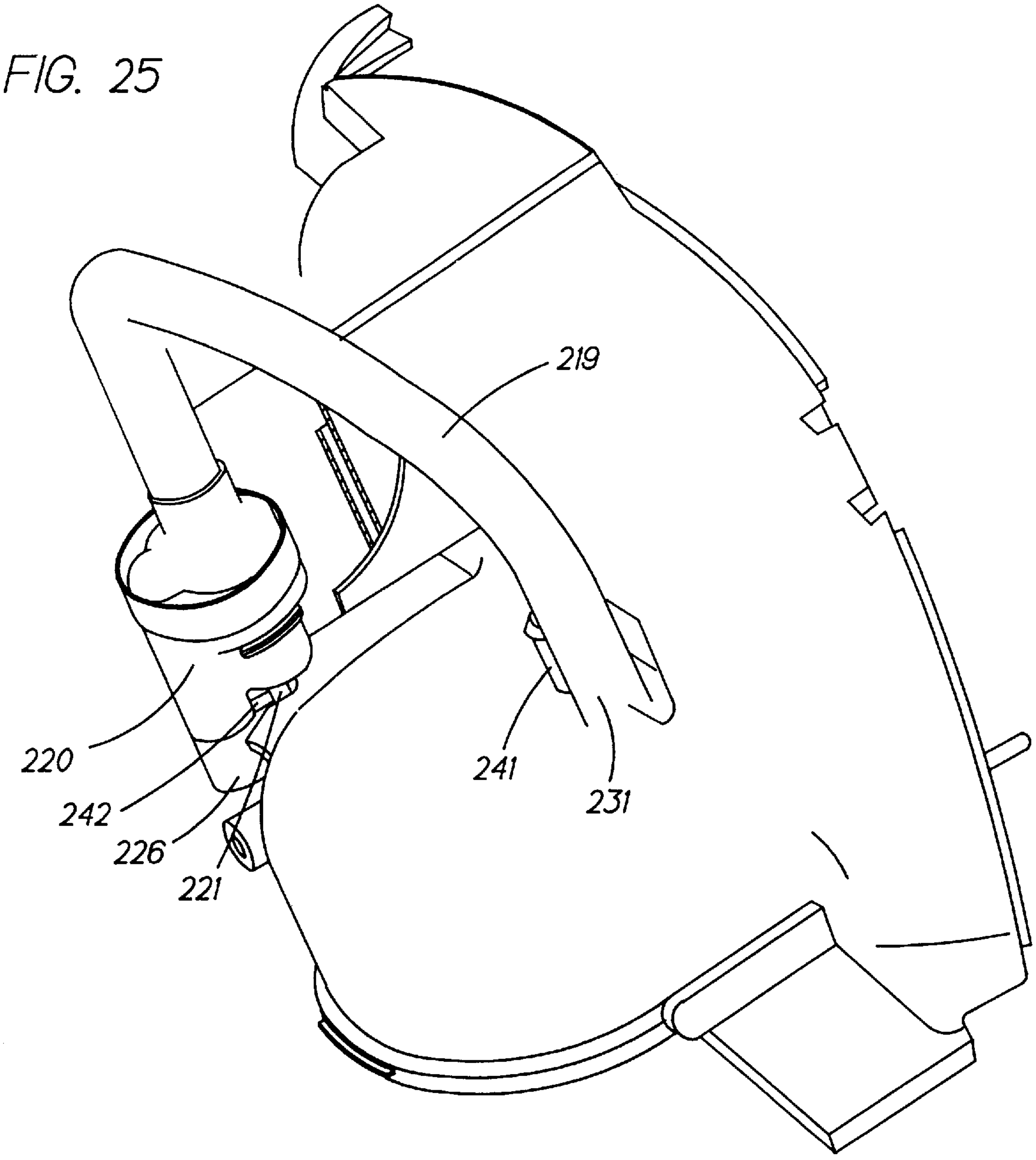
FIG. 25 is an additional perspective view in which the pressure relief mechanism is shown.
Figure 26:
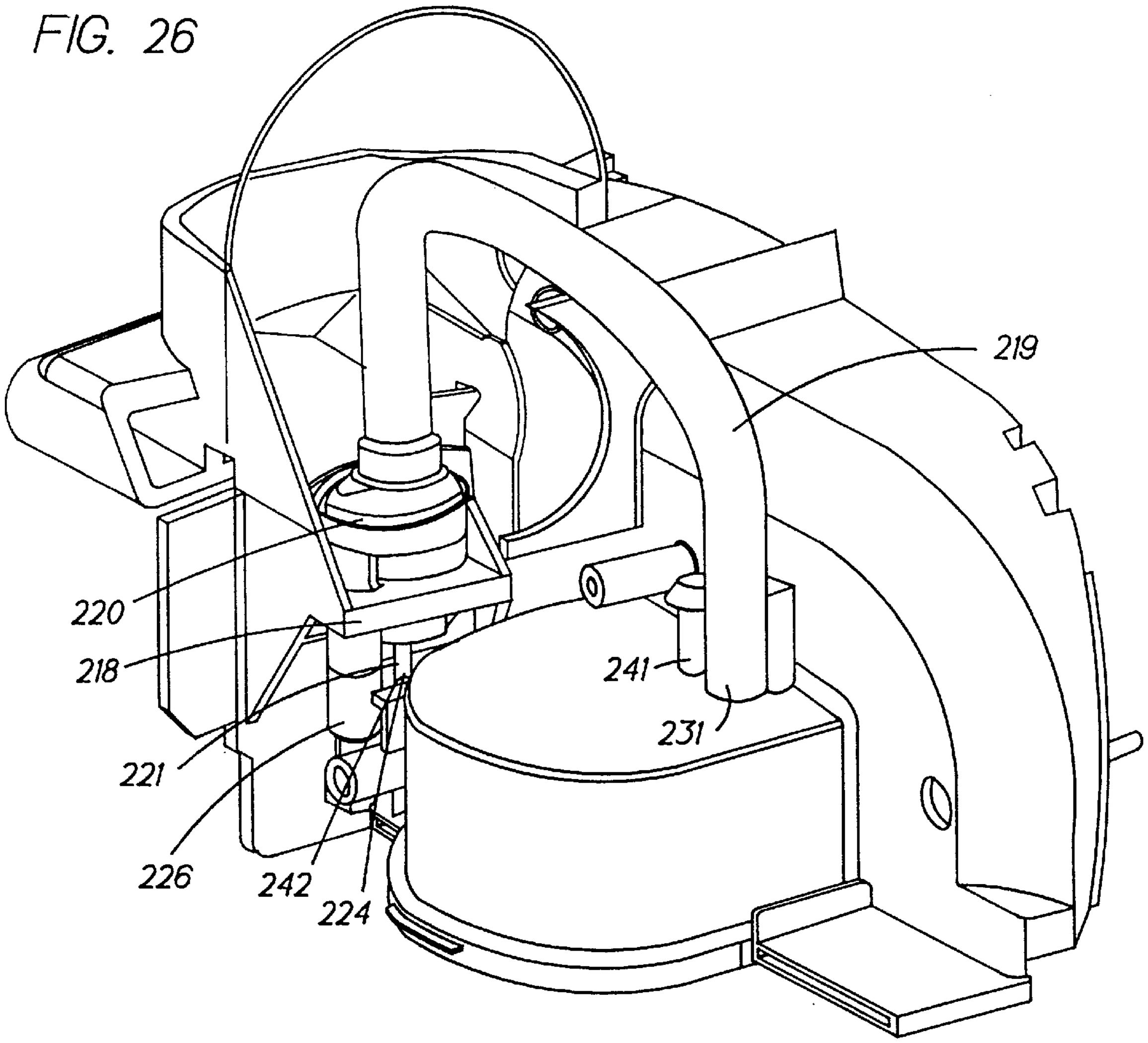
FIG. 26 is an additional perspective view in which the pressure relief assembly is shown in relation to the housing.
Figure 27:
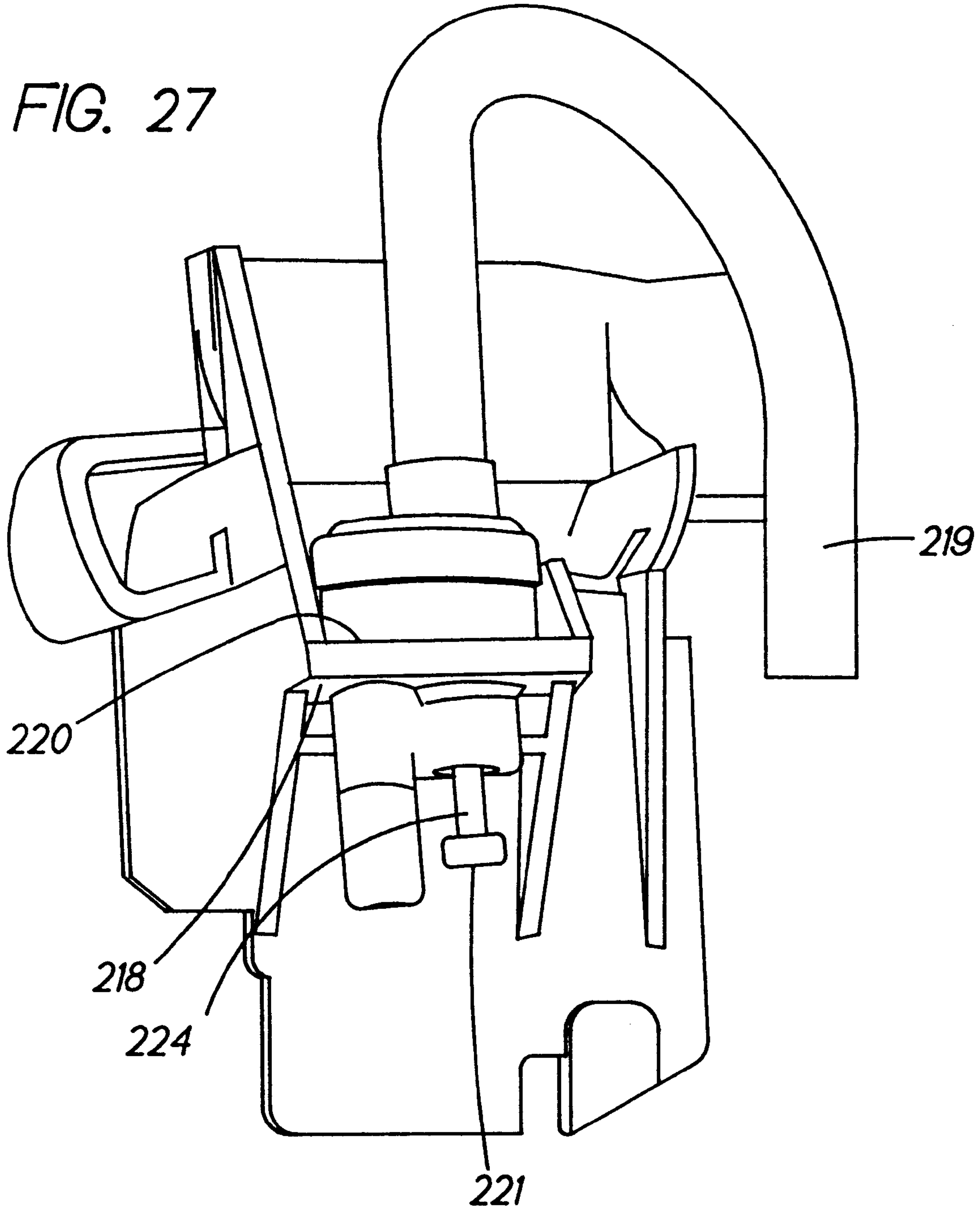
FIG. 27 is a perspective view of the entire pressure relief assembly.

As shown in FIGS. 23, 26 and 27, inside of head 200, release mechanism 210 comprises ribs 218 that support a pressure relief device 220. A main body of pressure relief device 220 is held on ribs 218, while a piston portion 221 of pressure relief device 220 is held in the housing by an opening 242 that accommodates reduced diameter portion 224 of piston 221. When slide 212 is lifted, the body of pressure relief device 220 moves with slide 212, while piston 221 is held down by housing portion 241, thereby opening pressure relief device 220 and venting air pressure out through vent pipe 226 and an integral tube (not shown) extending through the bottom of the housing at notch 227.

Figure 20:
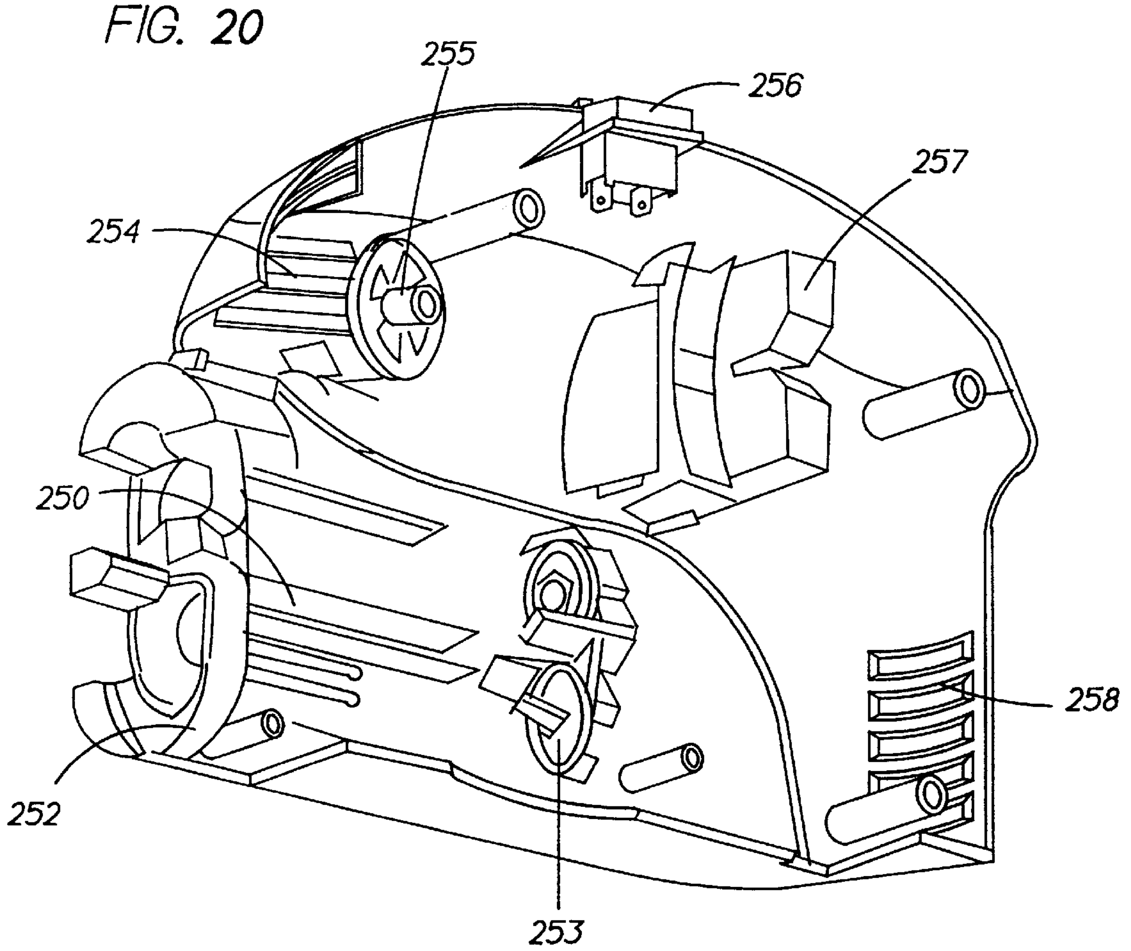
FIG. 20 is a perspective view of a partially assembled power head.

FIG. 20 illustrates the battery compartments including alignment ribs 250 for the batteries and battery release 252. Terminal boards 253 are provided near the bottom of alignment ribs 250. Air vents 254 and 258 appear at various locations on the power head. A pressure controller 255 is connected by air line to pump 222. A main switch 256 having a weather resistant cover is located on the top of power head 200. Front pump mount 257 is provided for mounting a pump that pressurizes tank 100.

Figure 21:
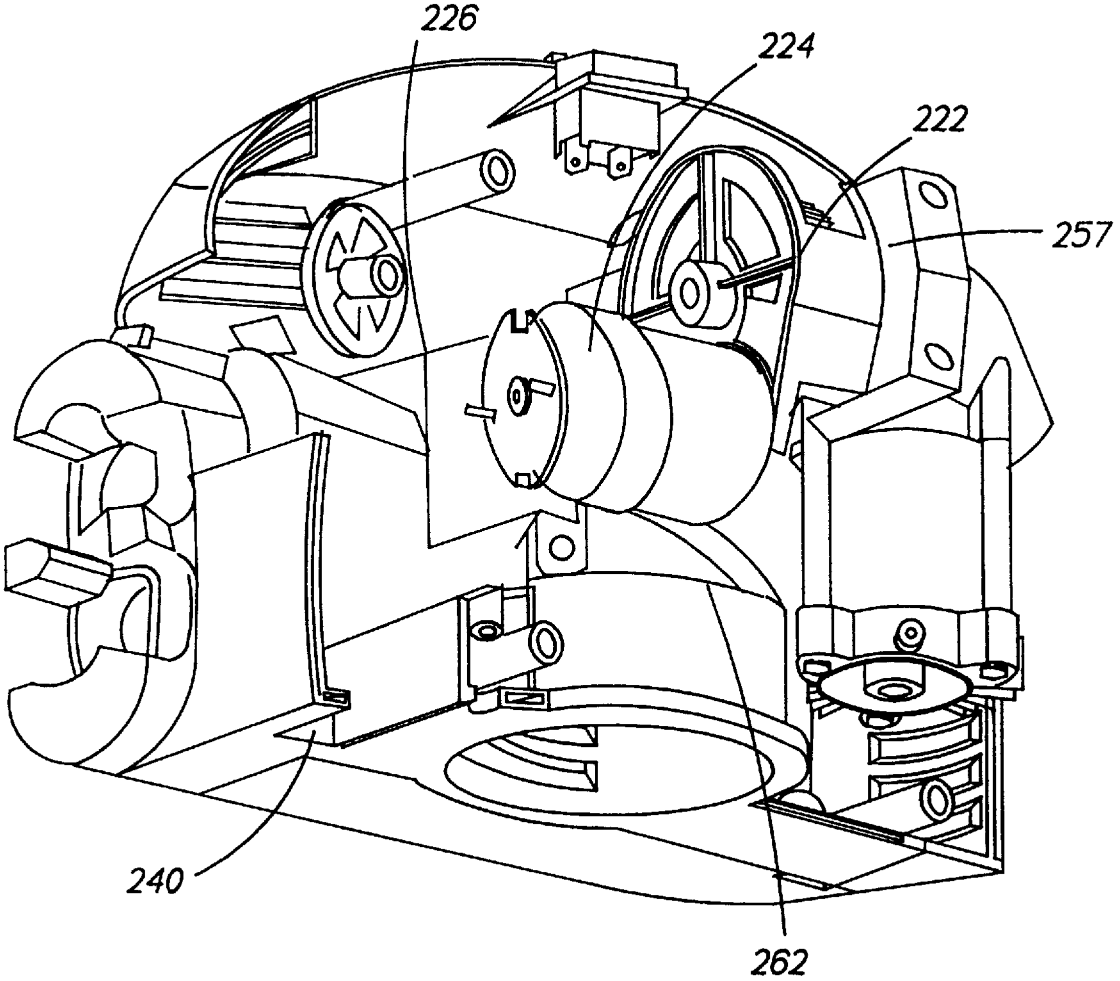
FIG. 21 is a perspective view of a further assembled power head.

As shown in FIG. 21, in its interior, power head 200 is equipped with a pump 222 powered by a motor 224. Pump 222 is mounted on front pump mount 257 and rear pump mount 259, and when powered by motor 224, pressurizes the interior of tank 100. Pressure controller 255 is actuated when tank pressure gets below a given threshold in order to activate motor 224 and pump 222 to pressurize the interior of tank 100. Batteries are provided in the battery compartments for powering motor 224 and pump 222. Air vents 254 and 258 provide air inlet and cooling entry within power head 200.

Figure 22:
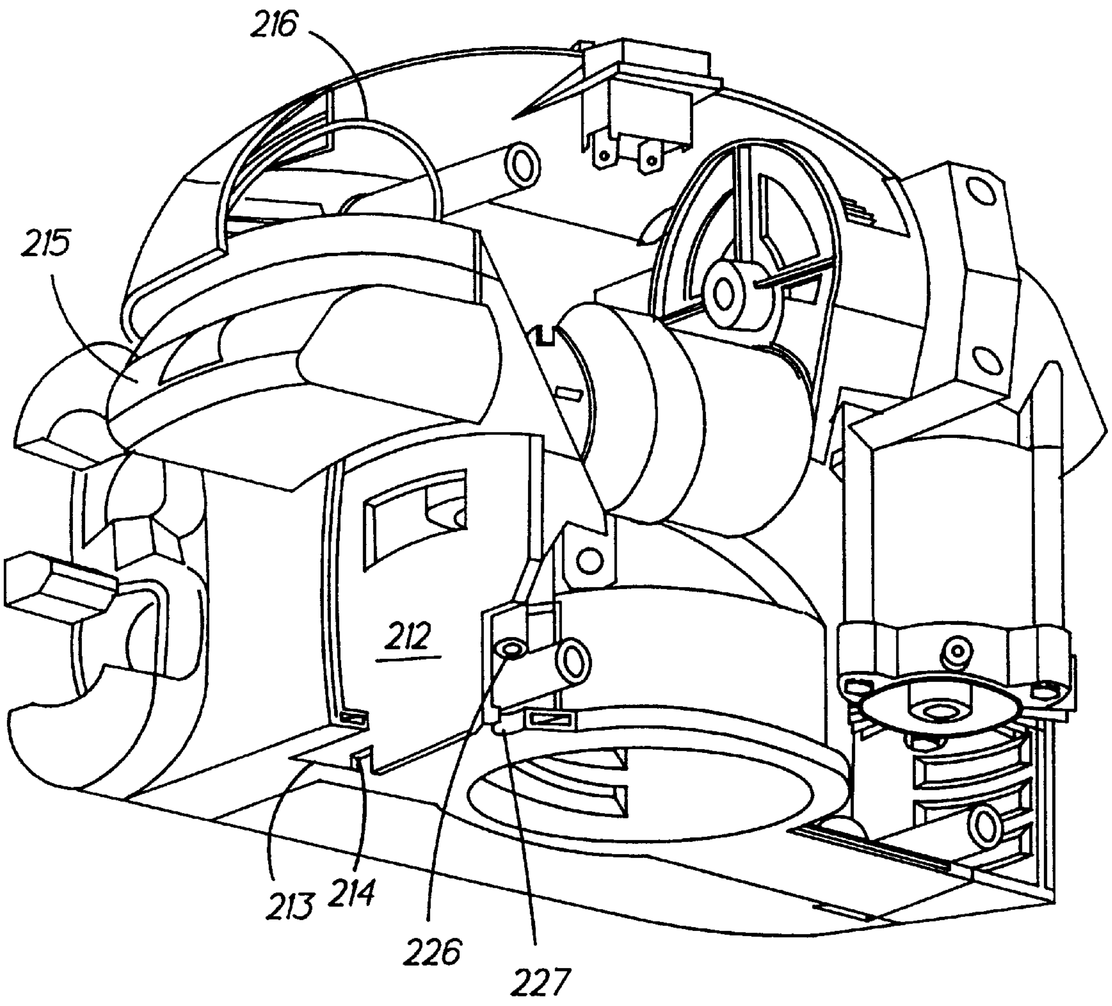
FIG. 22 is a perspective view of a further assembled power head.

As shown in FIG. 22, an integral molded spring 216 biases slide 212 toward tank 100. A ramp 213 is located at the base of slide 212 for abutting locking projections 104*a* on tank 100 as described in connection with FIG. 15. Notched portion 214 automatically locks onto locking projection 104*a* under the influence of spring 216 and pressure relief assembly mounted to slide 212.

FIG. 23 shows further features of the power head including the guide 240 in the housing. A complementary guide (not shown) exists on the opposite side of the slide 212. A hose 219 is provided for connecting opening and pressure relief device 220. A pressure relief tube 226 is provided for venting upon actuation of slide 212. Spigot 231 allows for connecting pressure relief hose 219 within opening 201 of power head 200. Spigot 241 provides a connection for a hose (not shown) from pump 222.

Pump 222 is preferably a piston pump, but may be of any configuration capable of functioning within power head 200.

FIGS. 24 through 29 more clearly illustrate the details of pressure relief mechanism 220. The mechanism serves a dual function when incorporated in the pump/tank environment. As already explained in detail with reference to FIGS. 15 and 20 through 23, the mechanism functions in conjunction with lever 215 and slide 212 to relieve pressure while unlocking head 200. Additionally, pressure relief mechanism 220 will automatically cause venting when the pressure in the tank reaches a predetermined threshold pressure. The over-pressurized condition causes piston 221 to move downwardly, thereby creating an air passageway such that venting can occur through tube 226. As shown in FIG. 23 and more clearly shown in FIG. 24, reduced diameter portion 224 of piston 221 can freely move downwardly within the opening 242 in the housing 241. However, because of enlarged diameter portion 225 of piston 221, the piston cannot move upwardly within opening 242.

Accordingly, the pressure relief mechanism includes two moveable portions. When pressure is intentionally relieved by translation of lever 215, a first or main body portion 250 of the pressure relief mechanism 220 is caused to move upwardly. This upward movement creates an air passageway such that venting occurs through tube 226. Alternatively, when over-pressure conditions occur, piston 221, or the second portion of the pressure relief mechanism 220, is forced downwardly, thereby creating an air passageway to allow venting through tube 226. Thus, within one structure, the pressure relief mechanism is able to perform this dual function.

Figure 28A:
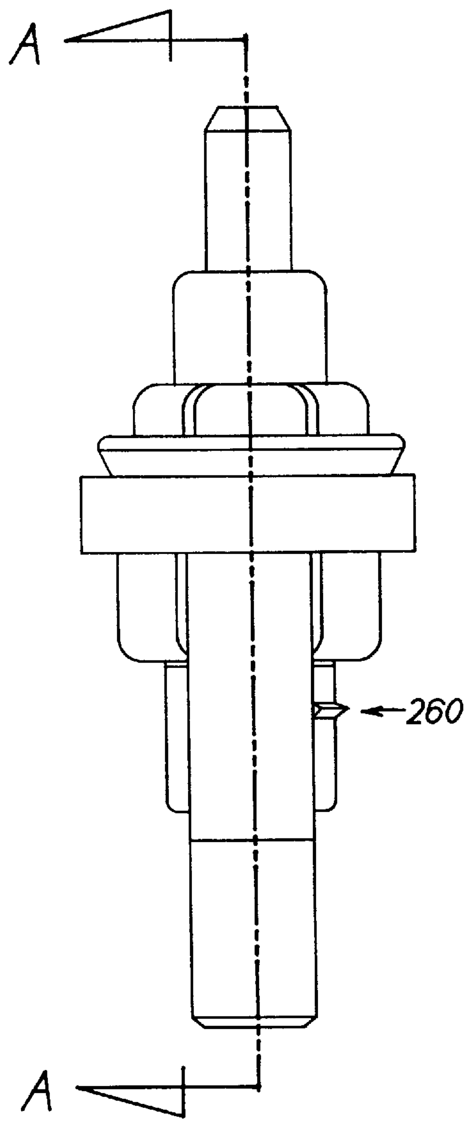
FIG. 28A is an elevation of the pressure relief mechanism outside of the housing.
Figure 28B:
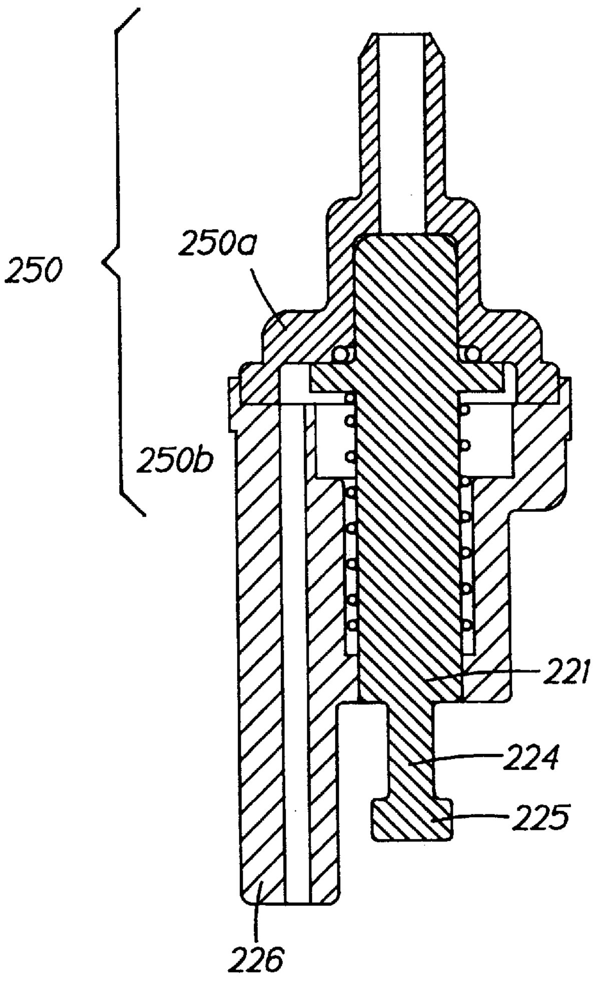
FIG. 28B is a sectional view of the pressure relief mehanism of FIG. 28A.

FIGS. 28(A) and 28(*b*) isolate the pressure relief mechanism. Upper housing 250*a* and lower housing 250*b* form the complete housing 250. Ribs 218 of the release mechanism engage body 250 at engagement portion 260 (See 28(*a*)). When lever 215 is lifted, the entire body portion 250 is also lifted, while piston 221 remains stationary.

Figure 29:
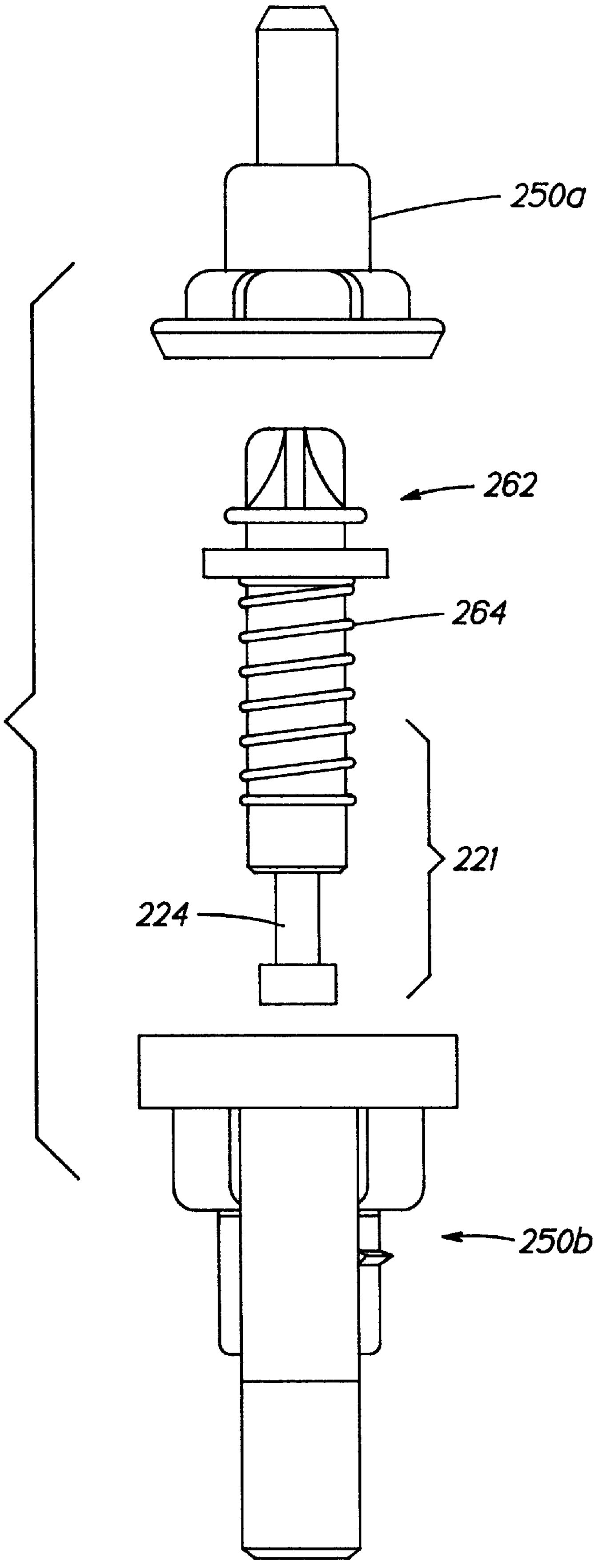
FIG. 29 is an exploded view of the pressure relief assembly.

FIG. 29 is an exploded view of the pressure relief mechanism that shows upper housing 250*a* and lower housing 250*b* encapsulating piston 221. O-ring 262 is positioned on the upper portion of piston 221 and a spring 264 biases piston 221 in position.

Figure 30:
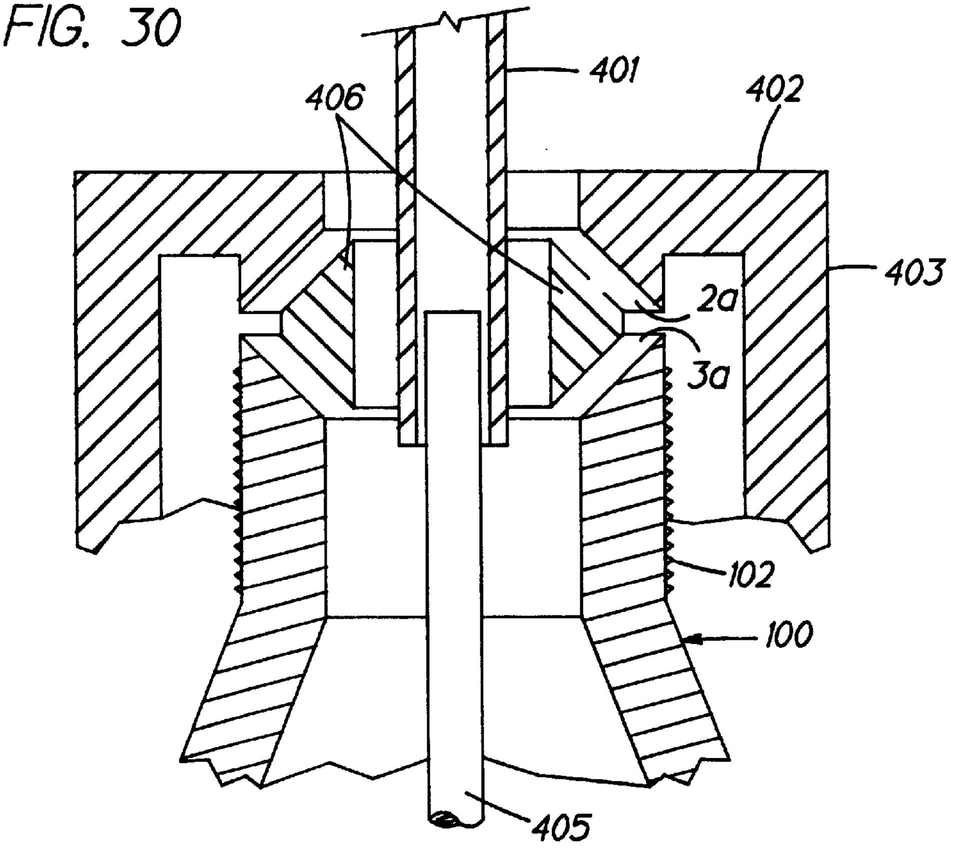
FIG. 30 is a schematic view of a hose to tank connection of the sprayer assembly.

As shown in FIG. 30, a simple and effective hose to tank connection is provided for transporting fluid between tank 100 and an outlet hose. The outlet hose to tank connection utilizes externally threaded outlet 102 of tank 100. A flexible hose 401 is connected through cap 402 to tank 100. Hose 401 extends around siphon tube 405. A gasket 406 is disposed adjacent the lip of threaded outlet 102, surface 403 of cap 402, and hose 401. Threaded outlet 102 of tank 100 and cap 402 exert a compressive force on gasket 406, thereby causing hose 401 to be flared out at its lower end and held open.

Figure 31:
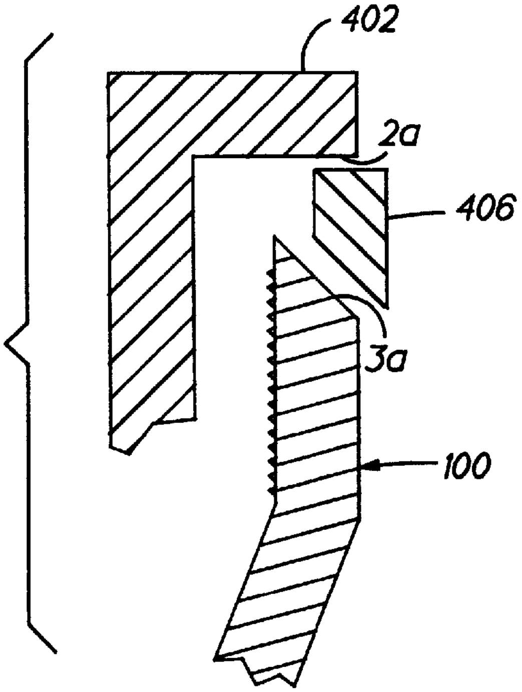
FIG. 31 is a partial schematic view of an alternative embodiment of the hose to tank connection.

FIG. 31 shows an alternative configuration for the se of gasket 406 and cap 402.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A pressure relief assembly for a pressurized tank sealed by a lid, wherein the pressure relief assembly prevents the pressurized tank from exceeding a threshold pressure and prevents a sudden pressure drop when the lid is removed from the tank, the pressure relief assembly comprising:

a pressure relief mechanism supported with respect to a housing which contains a pump unit and comprising a first portion and a second portion that is relatively displaceable with respect to the first portion and to the housing for opening an air passage to allow venting;

wherein movement of the first portion relative to the housing causes pressure relief and substantially simultaneously causes unlocking of the lid; and movement of the second portion relative to the housing causes venting without unlocking of the lid and is automatic in response to a threshold pressure condition in the tank.

2. The pressure relief assembly of claim 1, wherein the first portion is adapted to be moved manually by a lever operatively associated with the first portion.

3. The pressure relief assembly of claim 1, wherein the first portion comprises a main body and the second portion comprises a piston.

4. The pressure relief assembly of claim 1, further comprising a latch operatively connected with the first portion, such that when the first portion is moved relative to the housing to relieve pressure, the latch unlocks the lid with respect to the tank such that the lid and tank become relatively rotatable substantially simultaneously with pressure relief.

5. The pressure relief assembly of claim 4, wherein the latch comprises a slot adapted for receiving the tank, thereby locking the lid with respect to the tank.

6. The assembly of claim 5, wherein the latch further comprises a ramp leading to the slot, the ramp adapted for displacing the first portion.

7. An apparatus for disconnecting a pump unit from a tank, wherein the pump unit and tank are releasably connected, and wherein tank pressure is relieved prior to disconnecting the pump unit and the tank, the apparatus comprising:

a pressure relief mechanism comprising a first portion and a second portion, relatively displaceable with respect to one another, wherein when the first portion is moved relative to the second portion, an air passage is opened between the first portion and the second portion to cause pressure relief; and a latch operatively connected with the first portion, such that when the first portion is moved relative to the second portion, the latch unlocks the pump unit with respect to the tank such that the pump unit and tank become relatively rotatable.

8. The apparatus of claim 7, wherein the first portion comprises a main body and the second portion comprises a piston.

9. The apparatus of claim 8, wherein the main body is connected with a lever which comprises a slide adapted for translation with respect to the piston.

10. The apparatus of claim 9, wherein the lever projects outwardly from the slide, such that translational movement of the lever causes movement of the main body, while the piston remains immobile.

11. The apparatus of claim 10, wherein the lever is operatively connected with the latch, wherein the latch comprises a slot adapted for receiving the tank, thereby locking the pump unit with respect to the tank.

12. The apparatus of claim 11, wherein the latch further comprises a ramp leading to the slot, the ramp being adapted for displacing the main body of the pressure relief assembly.

13. The apparatus of claim 8, further comprising a spring biasing the slide with respect to the pump unit, wherein translating the slide against the spring bias from a locked position to an unlocked position creates an air passage thereby depressurizing the tank and enabling relative rotation of the pump unit and the tank.

14. An electric powered portable sprayer having a pressure relief assembly mounted in a housing containing a pump unit for preventing a pressurized vessel from exceeding a predefined threshold pressure, the pressure relief assembly comprising:

a pressure relief device including a piston having multiple cross sectional areas, the piston having a first cross-sectional area at a longitudinal central portion that is relatively smaller than a second cross-sectional area at a longitudinal end; and a housing having an opening receiving the longitudinal central portion and engaging the longitudinal end so as to restrict movement of the piston in a first direction and allow movement of the piston in a second direction;

wherein, when the pressurized vessel exceeds the predefined threshold pressure limit, automatic movement of the piston in the second direction causes venting to relieve pressure in the pressurized vessel.

15. The pressure relief assembly of claim 14, wherein the opening has a smaller area than the second cross-sectional area at the longitudinal end of the piston.

16. The pressure relief assembly of claim 14, further comprising a main body surrounding a portion of the piston, wherein the main body is capable of remaining fixed during movement of the piston.

17. A portable assembly for spraying a fluid, said assembly comprising:

a tank adapted for containing the fluid;

a pump unit for pressurizing said tank; and a release mechanism comprising:

a displaceable slide;

a latch extending from the slide, adapted for engaging and disengaging the tank with respect to said pump unit; and a pressure relief mechanism adapted for communicating with the fluid, said relief mechanism including a valve and a valve seat, one of said valve and valve seat being fixed with respect to said slide, wherein said release mechanism is adapted for locking said tank with respect to said pump unit and for unlocking said tank with respect to said pump unit and de-pressurizing the fluid in said tank.

18. The mechanism according to claim 17, wherein a lever is fixed with respect to the slide and extends outside of the pump unit.

19. The mechanism according to claim 17, further comprising: a spring biasing the latch into engagement with said tank.

20. The mechanism according to claim 17, wherein said latch includes a slot adapted for receiving therein a projection from said tank, thereby locking said pump unit with respect to said tank.

21. The mechanism according to claim 20, wherein said latch further includes a ramp leading to said slot, said ramp adapted for cooperating with said projection.

22. A mechanism for locking a pump unit with respect to a tank, and for unlocking the pump unit with respect to the tank and de-pressurizing fluid in the tank, said mechanism comprising:

a sliding mechanism that is displaceable with respect to the pump unit;

a latch adapted for engaging the tank thereby locking the pump unit with respect to the tank, and adapted for disengaging said tank thereby unlocking the pump unit with respect to the tank, said latch being fixed to the sliding mehanism; and a pressure relief mechanism adapted for communicating with the fluid, said relief mechanism including a valve and a valve seat, a first one of said valve and valve seat being fixed with respect to said sliding mechanism and a second one of said valve and valve seat being fixed with respect to the pump unit.

23. The mechanism according to claim 22, wherein said sliding mechanism is a slide adapted for translation with respect to said pump unit.

24. The mechanism according to claim 22, further comprising:

a lever fixed with respect to said sliding mechanism and projecting outside said pump unit;

wherein said lever is adapted for disengaging said latch from the tank.

25. The mechanism according to claim 22, further comprising:

a spring between said sliding mechanism and said pump unit;

wherein said spring is adapted for biasing said latch into engagement with said tank.

26. The mechanism according to claim 22, wherein said latch includes a slot adapted for receiving therein said tank, thereby locking the pump unit with respect to the tank.

27. The mechanism according to claim 26, wherein said latch further includes a ramp leading to said slot, said ramp being adapted for displacing said sliding mechanism away from said tank.

28. A pressure relief assembly for a pressurized tank sealed by a lid, wherein the pressure relief assembly prevents the pressurized tank from exceeding a threshold pressure and prevents a sudden pressure drop when the lid is removed from the tank, the pressure relief assembly comprising:

a pressure relief mechanism supported with respect to a housing and comprising a first portion adapted to be moved manually by a lever operatively associated with the first portion and a second portion that is relatively displaceable with respect to the first portion and to the housing for opening an air passage to allow venting;

wherein movement of the first portion relative to the housing causes pressure relief and substantially simultaneously causes unlocking of the lid; and movement of the second portion relative to the housing causes venting without unlocking of the lid and is automatic in response to a threshold pressure condition in the tank.

* * * * *